(12) United States Patent
Krivoshein et al.

(10) Patent No.: US 6,446,202 B1
(45) Date of Patent: Sep. 3, 2002

(54) PROCESS CONTROL CONFIGURATION SYSTEM FOR USE WITH AN AS-INTERFACE DEVICE NETWORK

(75) Inventors: Kenneth D. Krivoshein, Elgin; Andrew P. Dove, Austin; Gary K. Law, Georgetown, all of TX (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 0 days.

(21) Appl. No.: 09/412,076

(22) Filed: Oct. 4, 1999

(51) Int. Cl.$^7$ .............................................. G06F 17/00
(52) U.S. Cl. .............................................. 713/1; 700/1
(58) Field of Search .............................. 703/1; 700/1–7, 700/75

(56) References Cited

U.S. PATENT DOCUMENTS

| | | | | |
|---|---|---|---|---|
| 5,828,851 A | | 10/1998 | Nixon et al. ................. | 395/285 |
| 5,838,563 A | | 11/1998 | Dove et al. .................. | 364/188 |
| 5,862,052 A | * | 1/1999 | Nixon et al. ........... | 364/468.24 |
| 5,940,294 A | * | 8/1999 | Dove .......................... | 364/188 |
| 5,980,078 A | * | 11/1999 | Krivoshein et al. .......... | 364/131 |
| 6,032,208 A | * | 2/2000 | Nixon et al. ................... | 710/64 |
| 6,098,116 A | * | 8/2000 | Nixon et al. ..................... | 710/8 |
| 6,195,591 B1 | * | 2/2001 | Nixon et al. .................. | 700/83 |
| 6,266,726 B1 | * | 7/2001 | Nixon et al. ................. | 710/105 |

OTHER PUBLICATIONS

AS–I Trade Organization, "Actuator Sensor Interface Technical Overview," Jun. 2000.
FieldComms UK. The Industrial Networking Show and Conference, Proceedings of FieldComms UK, Hinckley, UK, Nov. 5–6, 1996; pp. 109–116; Coates R; ASI—the very practical solution.
InTech (USA), InTech, Apr. 1999, ISA, USA; vol. 46; No. 4; pp. 43–46; ISSN 1092–303X; Olson M; Byres E; Fieldbus part 2: Configuration tools, Removing the complexity from start–up is goal.

Search Report issued by UK Patent Office for Patent Application No. GB 0023115.9 dated Dec. 22, 2000.

* cited by examiner

Primary Examiner—Thomas M. Heckler
(74) Attorney, Agent, or Firm—Marshall, Gerstein & Borun.

(57) ABSTRACT

A configuration system for use in a process control network having a controller, a first device network that communicates using a first input/output protocol, such as a Fieldbus or a HART device protocol, and an AS-Interface device network that communicates using an AS-Interface input/output communication protocol includes a configuration database that stores configuration information pertaining to the first device network and configuration information pertaining to the AS-Interface device network, a data access routine that automatically requests configuration information pertaining to the first device network and configuration information pertaining to the AS-Interface device network and a configurator that configures the AS-Interface device network based on the AS-Interface device network configuration information. The configurator stores the AS-Interface device network configuration information in the configuration database along with configuration information pertaining to the first device network. A documentation routine accesses the configuration database to display a process control documentation schematic illustrating the configuration of the first device network and the AS-Interface device network within the process control system.

46 Claims, 16 Drawing Sheets

PROCESS CONTROL SYSTEM

LIBRARY
    Fieldbus Devices
        Manufacturer
            Device Type
                Device Revision
                      Function Block Name
                          Execution Time
                          Index
                          .
                          .
                          .

HART Devices
        Manufacturer
            Device Type
                Device I.D.
                      Description
                      Diagnostic Properties
                  .
                  .
                  .

Profibus Devices
        Family - FAM1
            Manufacturer - MAN1
                Model - MODEL1
                    Device Revision - REV1
                        Device Wide Parameter - PARAM1
                        Module - MODULE1
                            Parameter - PARAM2
                            Signal - SIGNAL1
                    .
                    .
                    .

AS-Interface Devices
        ASI Device Type - DeviceType1
                .
                .
                .

FIG. 5A

SYSTEM CONFIGURATION
  Physical Network
    Control Network
      Controller - CONTROLLER1
        I/O
          Fieldbus Card
            P01
              D01
                FunctionBlock 1
                FunctionBlock 2
              D02
                FunctionBlock 3
              D03
                FunctionBlock 4
          .
          .
          .

HART Card
            C01
              SignalTag1
            C02
              SignalTag2
            C03
              SignalTag3
          .
          .
          .

Profibus Card
            P01
              Device - PBDEV1
                Device Wide Parameter - PARAM1
                Slot - SLOT1
                  Slot Parameter - PARAM2
                  Signal - SIGNAL1
                    DST1
                  Signal - SIGNAL2
                    DST2
            .
            .

AS-Interface Card
            P01
              ASI Device - ASDEV1
                ASI Discrete I/O - InputD1
                  DST1
                ASI Discret I/O - InputD2
                  DST2
            .
            .
            .

FIG. 5B

PROCESS CONTROL CONFIGURATION SYSTEM FOR USE WITH AN AS-INTERFACE DEVICE NETWORK

FIELD OF THE INVENTION

The present invention relates generally to process control systems and, more particularly, to a process control configuration system that integrates the configuration and control of device networks which use a local or specialized input/output interface with the configuration and control of device networks which use a remote input/output interface, such as the AS-Interface device interface.

DESCRIPTION OF THE RELATED ART

Process control systems, like those used in chemical, petroleum or other processes, typically include at least one centralized process controller communicatively coupled to at least one host or operator workstation and to one or more field devices via analog and/or digital buses or other communication lines or channels. The field devices, which may be, for example, valves, valve positioners, switches, transmitters (e.g., temperature, pressure and flow rate sensors), etc. perform functions within the process such as opening or closing valves and measuring process parameters. The process controller receives signals indicative of process measurements made by the field devices and/or other information pertaining to the field devices via an input/output (I/O) device, uses this information to implement a control routine and then generates control signals which are sent over the buses or other communication channels via the input/output device to the field devices to control the operation of the process. Information from the field devices and the controller is typically made available to one or more applications executed by the operator workstation to enable an operator to perform any desired function with respect to the process, such as viewing the current state of the process, modifying the operation of the process, configuring the process, documenting the process, etc.

In the past, conventional field devices were used to send and receive analog (e.g., 4 to 20 milliamp) signals to and from the process controller via analog lines. These 4 to 20 ma signals were typically indicative of measurements made by the device or of control signals generated by the controller required to control the operation of the device. Each of these conventional field devices was typically individually connected, via a separate line or communication channel, to a local input/output (I/O) device which, in turn, was connected directly to a controller to enable communication between the controller and the devices. These separate lines or communication channels enabled signals measured by the device to be sent individually to the controller at any time or to enable control signals to be sent individually by the controller to the device at any time. This configuration, in which the I/O device multiplexes signals delivered directly from field devices to a controller and vice-versa is called local I/O.

In the past decade or so, smart field devices including a microprocessor and a memory have become prevalent in the process control industry. In addition to performing a primary function within the process, smart field devices may store data pertaining to the device, communicate with the controller and/or other devices in a digital or combined digital and analog format, and perform secondary tasks such as self-calibration, identification, diagnostics, etc. A number of standard and open smart device communication protocols such as the HART®, PROFIBUS®, Actuator Sensor Interface (hereinafter "AS-Interface" or "ASI"), WORLDFIP®, Device-Net®, CAN, and FOUNDATION™ Fieldbus (hereinafter "Fieldbus") protocols, and have been developed to enable smart field devices made by different manufacturers to be used together within the same process control network.

Generally speaking, for some of these specialized communication protocols such as the Fieldbus protocol, numerous devices are attached to a bus or a network and communicate with an I/O device (which is connected to the controller) over the bus or network. In the case of the Fieldbus protocol, each device is able to send one or more signals separately to the I/O device and, thereby, to the controller. As a result, the Fieldbus protocol uses a bus to perform specialized I/O because each device can communicate individual signals (having individual signal tag names, etc.) at any desired time or at particularly specified times. Similarly, the HART protocol uses a separate line or communication channel extending between each HART device and the I/O device, which enables HART signals to be sent separately to the local I/O device at any time. As a result, the HART protocol provides local I/O operations.

However, others of the smart protocols, such as the Profibus and the AS-Interface protocols, use what is commonly referred to as remote I/O because, generally speaking, the I/O device connected to the field devices is located remotely from the controller and is connected to the controller via a further I/O device. In effect, each Profibus and AS-Interface device (or groups of these devices) has an I/O unit associated therewith. This I/O unit, which is typically located on or near the device with which it is associated, receives the different signals associated with the device and then multiplexes these signals by concatenating these signals into a single data string and placing that data string onto the bus to which other Profibus or AS-Interface devices and, therefore, other Profibus or AS-Interface I/O units, are connected. The data strings from the remote I/O devices are sent over the bus and are received by a master I/O device which is typically located near the controller. The mater I/O device receives the data strings and places these data strings in a memory associated with the master I/O device. Likewise, the master I/O device sends commands and other signals to each of the remote I/O devices by concatenating a set of such signals together (i.e., all of the signals to be sent to a particular device) and then sending this concatenated data string over the remote I/O bus to the I/O units down in the field which, in turn, decode those signals and provide the decoded signals to the appropriate locations or modules of each device.

The master I/O device typically interfaces with a controller, such as a specially designed programmable logic controller (PLC), that performs process control functions. However, the controller or the PLC must know where the individual data associated with any particular signal is stored in the memory of the master I/O device to be able to receive data from a remote I/O field device. Likewise, the controller or the PLC must know where, in the master I/O device memory, to place commands and other data to be delivered to the remote I/O field devices over the remote I/O bus. Because of this requirement, the controller or PLC designer must keep track of what type of data (e.g., string, floating point, integer, etc.) is stored at each memory location within the master I/O device and what the data at each memory location within the master I/O device represents (e.g., to which signal of which remote I/O field device this data belongs). Likewise, when sending data to a remote I/O field device, the controller or PLC must be programmed to place the appropriate type of data at the appropriate memory location within the master I/O device to assure that the correct data string is sent to the designated remote I/O field device.

Most remote I/O communication protocols, such as the Profibus and AS-Interface protocols, specify only the form of the data strings to be placed on the remote I/O bus, e.g., how long the data strings can be, how many signals can be concatenated to form a single data string, the baud rate that the data strings are to be sent, etc., but do not specify or identify the type of data to be sent. Thus, while, the manufacturer of each Profibus device usually provides a GSD (a German acronym) file having some information about the device, such as the number and types of modules that can be placed in a device, the number of bits or bytes of input and output data associated with each device signal that is communicated to the device or received from the device over the Profibus bus, etc., the GSD file does not explain what the data in the string of data sent to and received from a device represents. As a result, the system configurator must keep track of what the data received at the Profibus master I/O device represents, including what signal this data represents and whether that signal is an analog, digital, floating point, integer, etc. value. Similarly, the AS-Interface devices, which send four-bit digital signals over a remote I/O bus, leave it up to the system designer to know or to understand what each of the bits being sent over the device network bus represents.

Because of the constraints placed on the process control system by the remote I/O network, prior art process control systems using remote I/O device networks required that the remote I/O device network, along with the master I/O device, be configured independently of the rest of the process control system to assure that the controller or PLC could then be configured to use the memory locations (within the master I/O device) selected or established for each of the signals associated with each of the remote I/O field devices. Thus, to configure a process control system that used remote I/O field devices in the prior art systems, the system engineer had to first set up the remote I/O device network by connecting all of the desired field devices and the remote master I/O device to the remote I/O bus. Then, using available configuration tools (provided by, for example, Siemens) run on a personal computer, such as a laptop computer, connected directly to the remote master I/O device, the configuration engineer had to enter data specifying the devices connected to the remote I/O bus. The configuration tool then configured the master I/O device and, in doing so, selected the memory locations within the master I/O device to be used for each of the signals being received from and sent to the remote I/O field devices. Thereafter, once the remote I/O device network was set up and the master I/O device was configured, the engineer had to program the controller or the PLC to get data from and send data to the appropriate memory locations within the remote master I/O device while performing a process control routine or function. This, of course, required the engineer to enter data pertaining to each of the remote I/O field devices (and the addresses of their associated signals in the master I/O device) into the controller or PLC configuration database. Next, if desired, the engineer had to provide documentation as to which remote I/O field devices were attached to the system and how the controller or PLC properly communicated with these devices via the master I/O device. This multi-step configuration process was time consuming, had to be done separate and apart from configuring the process control system to communicate with devices using specialized, local or conventional I/O and required the entry of the data related to the remote I/O devices in at least two and possibly three separate systems at two or three different times, i.e., when configuring the master I/O device, when configuring the controller or PLC to properly communicate with the master I/O device, and then when documenting the manner in which the remote I/O devices were communicatively coupled to the controller or PLC. The requirement to enter the same or similar data in multiple databases could lead to errors in the configuration or documentation.

As noted above, third party vendors now sell software and/or hardware systems that configure a Profibus master I/O device by populating a database with the necessary data to enable the master I/O device to provide communications over the Profibus network. However, to the extent these third party systems provide documentation of which signals are stored in which memory locations of the master I/O device, this documentation is limited to the devices in the Profibus network and is not capable of being used by any other network within the process control system not using the Profibus protocol without re-entry of that data in a different database.

The data coordination activities needed to keep track of and document which signals are being placed in what memory locations within the master I/O device, what physical phenomena those signals represent and how those signals are configured (i.e., what kind of data they represent) can therefore become very involved and tedious, especially when numerous devices are connected to the Profibus, AS-Interface or other remote I/O network. Furthermore, if not properly documented, this signal coordination can cause errors when reconfiguring the devices on the remote I/O device network because such reconfiguration tasks may require reprogramming of the controller or the PLC which would, necessarily, entail re-determining what each of the signals in each of the registers of the PLC or in the controller represent and how these signals are obtained from the memory of the master I/O device.

The problem of configuring and documenting a process control system that uses both remote and local or specialized I/O is further exacerbated by the fact that process controllers and process control systems are usually configured to operate using a different communication strategy than the communication strategy of the remote I/O network. For example, the DeltaV™ controller system manufactured and sold by Fisher-Rosemont Systems, Inc. located in Austin, Tex., has been designed to use a control and communication strategy similar to that used by the Fieldbus protocol. In particular, the DeltaV controller system uses function blocks located in a controller or in different field devices (such as Fieldbus field devices) to perform control operations and specifies interconnections between function blocks using signals given unique signal tags or path names (typically representing where the signals originated) commonly referred to as device signal tags (DSTs). Each function block receives inputs from and/or provides outputs to other function blocks (either within the same device or within different devices), and performs some process control operation, such as measuring or detecting a process parameter, controlling a device or performing a control operation like implementing a proportional-derivative-integral (PID) control routine. The different function blocks within a process control system are configured to communicate with each other (e.g., over a bus or within a controller) to form one or more process control loops, the individual operations of which may be spread throughout the process to make the process control more decentralized. The DeltaV controller uses a design protocol very similar to that used by the Fieldbus devices and, therefore, enables a process control strategy to be designed for the controller and have elements thereof downloaded to the Fieldbus device connected to the controller. Because the DeltaV controller and the Fieldbus devices operate using basically the same function block design construct, the controller can easily communicate with the Fieldbus devices and relate incoming signals from function blocks within the Fieldbus devices to function blocks within the controller. Likewise, Fieldbus devices and other devices that use specialized, local or conventional I/O can and are configured using a common configuration routine because the configuration routine can specify signals to be sent between function blocks, wherein each signal has a unique path or tag name. In fact, because the Fieldbus (which is a specialized I/O environment) and local I/O environments enable communication of each signal from a device separately over a communication channel to the controller, it is a fairly straightforward matter for the controller to send signals to and receive signals from the these devices and to configure the system using these devices using a common configuration database. As a result, the configuration routine for the DeltaV system already provides a combined configuration database having information pertaining to the controller, the Fieldbus field devices and some limited information pertaining to other local or conventional I/O devices such as HART devices already integrated therein. However, because remote I/O device communication protocols, such as the Profibus protocol and the AS-Interface protocol, communicate a string of data related to multiple signals from a device, and cannot communicate signals individually to the controller, use of the configuration systems designed to provide control of local or specialized I/O devices was limited to local or specialized I/O device networks and was not extended to remote I/O device networks.

SUMMARY OF THE INVENTION

A process control configuration system integrates the configuration and documentation of devices connected to a control network using local I/O protocols, such as 4–20 ma, and HART protocols or specialized protocols, such as the Fieldbus protocol, with the configuration and documentation of devices connected to the control system using a remote I/O protocol, such as the Profibus and the AS-Interface communication protocols, to thereby enable the control system to communicate with and control different types of field devices using different communication protocols based on a common configuration database. In particular, a process control configuration system enables a user to enter data pertaining to one or more remote I/O devices and, preferably, automatically prompts the user for information pertaining to each of the remote I/O devices connected to the system via a remote I/O network to create device definitions for the remote I/O devices. The remote I/O device information, which may include information pertaining to the signals associated with each of the remote I/O devices, including user assigned signal tags or path names, is stored in the same database as information pertaining to other devices within the process control system, including devices which are connected to the system using local or specialized I/O. If desired, this database may be an object-oriented database having a hierarchy of objects used to define devices, modules and signals associated with devices.

After entering the information pertaining to each of the devices, modules, signals, etc. associated with the remote I/O devices (as well as other devices), the configuration system then creates and downloads to the master I/O master device associated with the remote I/O device network a runtime configuration which enables communication between a controller within the process control system and the remote I/O field devices. This runtime configuration will enable the controller to recognize where each of the signals associated with each of the remote I/O field devices is stored within the master I/O device, what each of those signals represents, the nature of these signals (i.e., whether they are digital, analog, floating point values, integer values, etc.), the signal name or path name associated with the signals, etc. so that the controller has all of the information needed to assign a signal path or signal tag to each of the signals delivered across the remote I/O bus, even though these signals cannot be individually sent across the remote I/O bus.

Still further, the configuration system automatically integrates the documentation of remote I/O devices with local or specialized I/O devices because it uses the same database to store information pertaining to the all of the devices connected to the system, whether they are connected via a local I/O device, a specialized I/O device or a remote I/O device. This documentation may be displayed on a common configuration documentation schematic have information pertaining to the devices in the local, specialized and remote I/O device networks.

According to one aspect of the invention, a configuration system for use in a process control network having a controller, a first device network that communicates using a first input/output protocol (such as a Fieldbus or a HART device network protocol) and a second device network that communicates using an AS-Interface input/output communication protocol includes a configuration database that stores configuration information pertaining to the first device network and configuration information pertaining to the AS-Interface device network. A data access routine automatically requests first device network configuration information pertaining to the first device network and second device network configuration information pertaining to the AS-Interface device network and may create device definitions for the AS-Interface device network. A configurator then configures the AS-Interface device network based on the AS-Interface device network configuration information and stores the AS-Interface device network configuration information in the configuration database.

According to another aspect of the invention, a method of configuring a process control system including a controller, a first device network that uses a first communication protocol and an AS-Interface device network which has an AS-Interface device connected to an AS-Interface I/O card includes the steps of creating a device definition associated with the AS-Interface device for storage in a configuration database and using a configuration documentation system to associate an indication of the AS-Interface device with a port of an AS-Interface I/O card to reflect the actual connection of the AS-Interface device to the process control system. The method also includes the steps of assigning a signal tag for a signal associated with the AS-Interface device, downloading a configuration of the port of the AS-Interface I/O card to the AS-Interface I/O card and configuring a control application to be run in the controller using the signal tag.

BRIEF DESCRIPTION OF THE DRAWINGS

FIGS. 5A and 5B are portions of a configuration documentation hierarchy schematic associated with the configuration system of FIG. 2 which integrates the documentation and configuration of devices connected in the control system via a Profibus I/O communication protocol and an AS-Interface I/O communication protocol with devices connected in the control system via a Fieldbus and a HART communication protocol;

DESCRIPTION OF THE PREFERRED EMBODIMENTS

Figure 1:
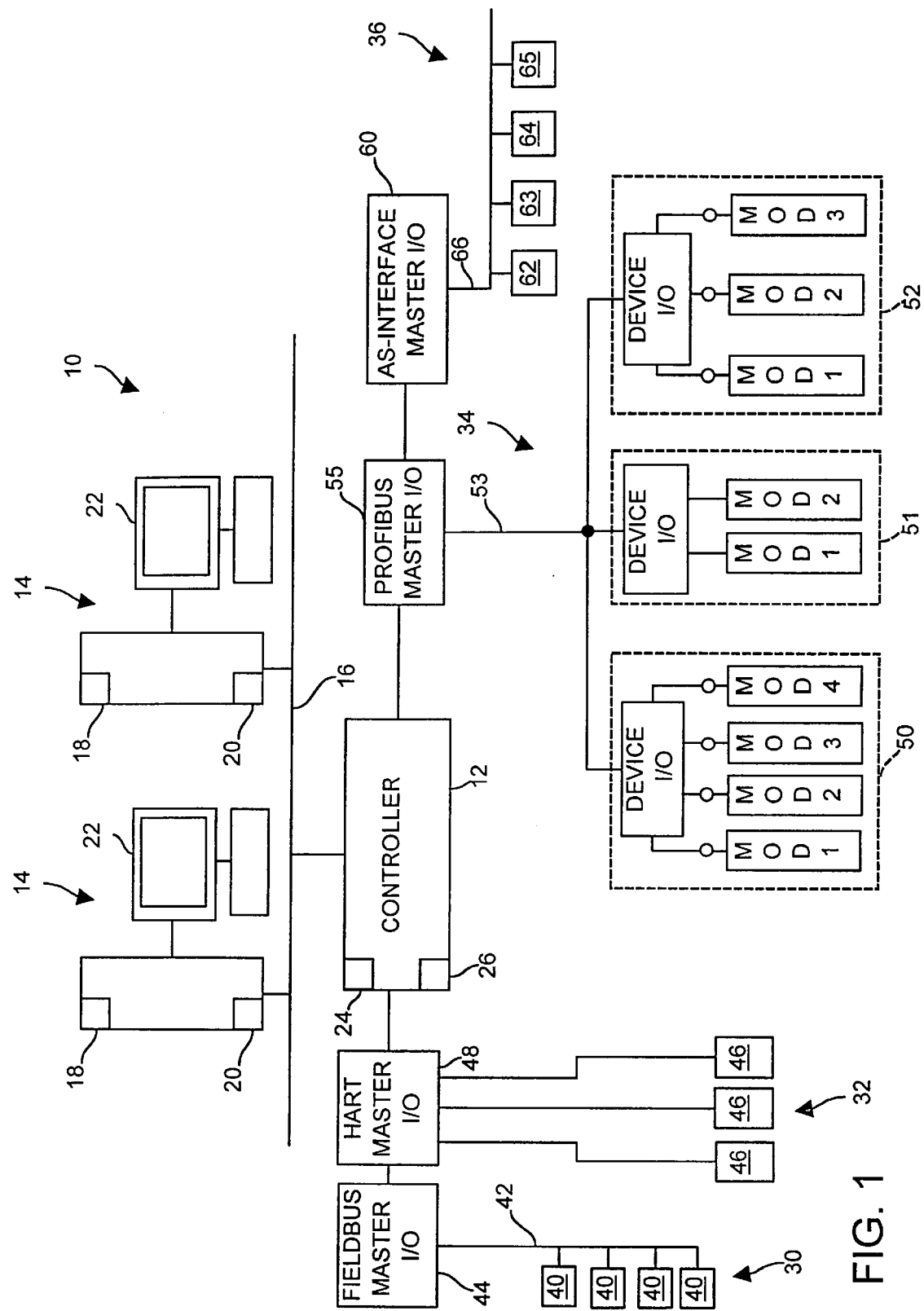
FIG. 1 is a block diagram of a process control system having a controller connected to a local I/O, a specialized I/O and remote I/O device networks.

Referring now to FIG. 1, a process control system 10 includes a process controller 12 connected to one or more host workstations or computers 14 (which may be any type of personal computer, workstation, etc.) via a communication network 16 such as an Ethernet connection or the like. Each of the workstations 14 includes a processor 18, a memory 20 and a display screen 22. Similarly, the controller 12, which may be by way of example only, the DeltaV™ controller sold by Fisher-Rosemount Systems, Inc., includes a processor 24 and a memory 26 for storing programs, control routines and data used by the processor 24 to implement control of a process. The controller 12 is coupled to numerous field devices within different device networks, including a Fieldbus device network 30, a HART device network 32, a Profibus device network 34 and an AS-Interface device network 36 via local connections or lines. Of course, the controller 12 could be connected to other types of field device networks such as 4–20 ma device networks and other local, specialized or remote I/O device networks in addition to or instead of the device networks illustrated in FIG. 1. The controller 12 implements or oversees one or more process control routines stored therein or otherwise associated therewith and communicates with devices within the device networks 30, 32, 34 and 36 and with the host workstations 14 to control a process and to provide information pertaining to the process to a user.

The Fieldbus device network 30 includes Fieldbus devices 40 connected via a Fieldbus link 42 to a Fieldbus master I/O device 44 (commonly referred to as a link master device) which, in turn, is connected to the controller 12 via a local connection. Generally speaking, the Fieldbus protocol is an all-digital, serial, two-way communication protocol that provides a standardized physical interface to a two-wire loop or bus that interconnects field devices. The Fieldbus protocol provides, in effect, a local area network for field devices within a process, which enables these field devices to perform process control functions (using function blocks) at locations distributed throughout a process facility and to communicate with one another before and after the performance of these process control functions to implement an overall control strategy. The Fieldbus protocol is known in the art and is described in detail in numerous articles, brochures and specifications published, distributed, and available from, among others, the Fieldbus Foundation, a not-for-profit organization headquartered in Austin, Tex. As a result, the details of the Fieldbus communication protocol will not be described in detail herein.

Similarly, the HART device network 32 includes a number of HART devices 46 connected via communication lines to a HART master I/O device 48 which is connected to the controller 12 via a standard local bus or other communication line. The HART protocol, which generally provides analog signals indicative of process parameters and digital signals indicative of other device information on each of the lines between the master I/O device 48 and the field devices 46, is also known in the art and will not be described further herein.

The Profibus device network 34 is illustrated as including three Profibus slave devices 50, 51 and 52 connected via a Profibus link or bus 53 to a Profibus master I/O device 55. The Profibus master I/O device 55 may be in the form of a Profibus PCMCIA card attached to a standard I/O interface card. Generally speaking, the Profibus-DP protocol is one of a family of protocols which was originally a German national standard (DIN 19245) developed principally by Siemens, and later made part of a European Fieldbus specification (EN 50 170). The chief function of this protocol is to provide an interface for remote I/O devices such as motor starters, solenoid valve terminals, and variable speed drives. Typically, this interface has been to programmable logic controllers (PLCs). The Profibus specification describes the behavior of three classes of devices including slave devices, such as the devices 50, 51 and 52, DP-master (class 1) devices, such as the device 55 and DP-master (class 2) devices (not shown in FIG. 1). Field devices are generally slave devices while the interface to a control application (such as one in the controller 12) requires a DP-master (class 1) device, e.g., the master device 55. DP-master (class 2) devices can configure and diagnose the communication capabilities of devices of the other classes. It will be understood, however, that the configuration performed by the master I/O devices in the Profibus protocol is limited to configuration of Profibus devices within the Profibus network 34 and does not include configuration of a control application stored in or executed by a PLC or a controller such as the controller 12 or configuration of field devices following other protocols.

A related protocol, Profibus Process Automation (Profibus-PA), is based on Profibus-DP and includes support for a new physical layer (the same as that used by Foundation Fieldbus), which can be interfaced to the Profibus-DP through a segment coupler. In addition, the Profibus-PA protocol includes a set of extensions to the Profibus-DP protocol which were developed specifically for support of Profibus-PA devices, but which can also be used for Profibus-DP devices. As a result, the Profibus master device 55 of FIG. 1 may be a Profibus-PA master, if desired. Of course other types of Profibus devices and protocols which now exist or which are developed in the future may be used in accordance with the present invention.

The main purpose of the Profibus-DP protocol is to cyclically exchange a set of data between the master I/O device 55 and each of the slave devices 50–52. Generally speaking, Profibus slave devices, such as the devices 50–52 of FIG. 1, can be quite complex. Also, there is no standard communication mechanism to configure the field application which uses the slave devices 50–52. Each slave device within the Profibus network 34 may be either a compact device, in which the number and order of modules within the device is fixed, or a modular device, in which a user may configure the number or order of the modules within the device. For the sake of illustration, the slave devices 50 and 52 of FIG. 1 are modular devices (having four and three replaceable modules associated therewith, respectively) while the slave device 51 is a compact device having two fixed modules associated therewith.

Before regular data exchange can occur over the Profibus link 53, each of the slave devices 50–52 must be configured. During the configuration process, the master I/O device 55 sends parameters to each of the slave devices 50–52 (known as parameterization) in the form of a parameterization data string and then performs a configuration consistency check. During parameterization, parameter data associated with each of the devices or the modules of the devices is sent to the slave devices 50–52. The device parameters are located first in the message, followed by parameters for the modules in the order of the module configuration. While supporting information for the Profibus devices may contain a description of the parameters associated with a device or a module within a device, and even give text to display for an enumerated bit field, the actual messages between the slave devices 50–52 and the master I/O device 55 provide no such information, it being left to the user or control application to identify or understand the meaning of the data being sent over the Profibus link 53.

During a consistency check, the master I/O device 55 sends its copy of configuration data (as a configuration data string) for each slave device 50–52 to the slave device, which verifies that the data from the master I/O device 55 matches the copy of the configuration data within the slave device 50, 51 or 52. Generally speaking, the configuration data for a Profibus-DP device includes a series of identifiers, each of which specifies the number of input and output bytes to be contained in each data exchange message, and whether these bytes are to be consistent with one another, i.e., whether the data within the different bytes were generated at the same or at different times. The order of the identifiers in the configuration data determines the placement of the data that each of the identifiers designates in the data exchange messages. For a modular device, the configuration data is generated based on the number and order of modules a user selects for a particular device. The configuration identifiers for each type of slave device are specified by a device database text file called a GSD (German acronym) file, which is supplied by the device manufacturer. In particular, the GSD file contains a list of named modules and the identifiers for each module and also includes identifications of the limits on the maximum number of modules and on the number of input and output bytes in the data exchange messages, information regarding baud rates, response times, protocol options, diagnostic error message codes, etc. As a result, it is desirable to have a GSD file for each slave device within a Profibus network to ease configuration of the master I/O device 55 for that network.

However, neither the configuration identifiers nor the GSD file for a Profibus device contains any information regarding the semantics or data type of the data exchanged between a master device and a slave device. Instead, the identifiers and the GSD file only specify the length of the data sent to and received from the slave device. The model assumed by Profibus-DP is that the data is stored in a designated memory location of the master I/O device 55, and that the control application which accesses this data knows the semantics and data type. This model is essentially the PLC register model where it is left to the user or control application to ensure that the operation being performed on a register is consistent with the type of data contained within the register.

The AS-Interface network 36 of FIG. 1 includes an AS-Interface master I/O device 60 connected to numerous AS-Interface field devices 62–65 via an AS-Interface bus or link 66. Generally speaking, the AS-Interface protocol uses a bit-level sensor bus to interface discrete I/O devices 62–65 (including I/O modules) to controllers such as programmable logic controllers. A good overview of the AS-Interface protocol is provided in a paper entitled "Actuator Sensor Interface Technical Overview" available from the AS-i Trade Organization in Scottsdale, Ariz., and, additionally, the AS-International Association maintains and issues the specification for this bus protocol. The AS-Interface specification describes the behavior of the bus master (the AS-Interface master I/O device 60) and its host interface and, thus, will not be described in detail herein. However, in order to properly operate the sensors and actuators 62–65 on the AS-Interface bus 66, the AS-Interface master I/O device 60 must conform to the AS-Interface master specification, which includes address and parameter configuration specifications in addition to data exchange specifications.

As will be seen, each AS-Interface device 62–65 will be assigned a user-assigned tag name, which is used to identify the device for configuration and diagnostic purposes. When an AS-Interface field device is created and assigned a tag, a discrete I/O point is generated for each valid input and output supported by the type of the device chosen by a configuration routine. A default device signal tag (DST), which may be changed by a user, is also generated for each such point. The run-time data for an I/O point includes a field value and a status, which are treated similar to the current discrete I/O card data. No semantic meaning for the I/O is recognized by the system other than input and output (i.e., the status/data bits are indistinguishable).

Device configuration for AS-Interface devices includes address assignment which is from 1 to 31, a device description (which has two four-bit values named I/O configuration and identification code), and four parameter bits. The device address of 0 is reserved for device addition or replacement because the AS-Interface master I/O device 60 enables on-line replacement of a device if it fails. However, the AS-Interface specification does not provide for duplicate address detection and, thus, it is the responsibility of the user to avoid using the same address for different devices on the same AS-Interface bus.

The I/O configuration bits of the AS-Interface designate which bits are valid inputs and/or outputs. Identification of the device is supplemented with the identification code. However, neither a device instance nor a device type has a unique designation. Therefore, while a user can determine that a device does not match what has been configured for a particular address on the AS-Interface network 36, the user cannot verify that a specific device type, such as a certain brand or type of proximity switch, is located at a particular address. Furthermore, an AS-Interface field device might not actually use any of the parameter bits for its application, but these bits still have to be written to the device to activate the device. However, there is no standard meaning for any of the parameter bits sent to a device during configuration. Likewise, the parameter bits cannot be read from a field device and, thus, a user must specify the value of these bits to a controller or PLC application. User-generated or imported definitions for specific devices designate the I/O configuration and identification code bits, in addition to input, output, and parameter bit labels.

As will be understood, the Fieldbus and the HART device networks 30 and 32 of FIG. 1 use local or specialized I/O to provide communications between the controller 12 and each of the devices 40 and 46 in that signals can be sent individually from each of the devices within these device networks to the master I/O device 44 or 48 and, from there, to the controller 12. On the other hand, the Profibus and AS-Interface networks 34 and 36 use remote I/O activities to communicate with the controller 12 because device signals or signals associated with a device are multiplexed together over a remote I/O bus, such as the buses 53 and 66.

Of course, the field devices illustrated in FIG. 1 may be any types of devices, such as sensors, valves, transmitters, positioners, etc. while the I/O cards 44, 48, 55 and 60 may be any types of I/O devices conforming to any desired or appropriate communication or device protocol. Furthermore, field devices conforming to other standards or protocols besides the Fieldbus, HART, Profibus and AS-Interface protocols, including any standards or protocols developed in the future, could be coupled to the controller 12 of FIG. 1. Likewise, more than one controller 12 can be coupled to the system 10 and each controller 12 may be communicatively coupled to one or more different device networks. Also, the local or specialized device network, such as the Fieldbus device network or the HART device network, may be coupled to a different controller than the remote device network, such as the Profibus or the AS-Interface device network.

The controller 12 of FIG. 1 may be configured to implement a control strategy using what are commonly referred to as function blocks, wherein each function block is a part (e.g., a subroutine) of an overall control routine and operates in conjunction with other function blocks via communications called links to implement process control loops within the process control system 10. Function blocks typically perform one of an input function, such as that associated with a transmitter, a sensor or other process parameter measurement device, a control function, such as that associated with a control routine that performs PID, fuzzy logic, etc. control, or an output function which controls the operation of some device, such as a valve, to perform some physical function within the process control system 10. Of course hybrid and other types of function blocks exist. Function blocks may be stored in and executed by the controller 12, which is typically the case when these function blocks are used for, or are associated with signals generated by standard 4–20 ma devices, HART devices, Profibus devices and AS-Interface devices, or may be stored in and implemented by the field devices themselves, which may be the case with Fieldbus devices. While the description of the control system is provided herein using function block control strategy, the control strategy could also be implemented or designed using other conventions, such as ladder logic or other standard programming paradigms including any standard programming language.

As noted above, in the past, after a user physically connected the devices within the system 10 as illustrated in FIG. 1, the user still had to configure each of the master I/O devices 44, 48, 53 and 66 to communicate with the devices on the associated bus and then had to configure the controller 12 to communicate with the master devices 44, 48, 55 and 60 to obtain the signals needed to run the control routine within the controller 12 or to send output or control signals to devices according to a control routine within the controller 12. In, for example, the DeltaV system, the user could enter information pertaining to Fieldbus devices, such as the manufacture, device type, revision, function blocks contained within the devices, etc. in a configuration routine run in one of the workstations 14 and, upon download of a control routine or upon download of a port associated with the Fieldbus master I/O device, the configuration routine would configure the Fieldbus master I/O device 44 with the appropriate information to enable operation of the Fieldbus network 30. Limited information pertaining to HART devices, such as signal tags associated with each of the channels (or I/O ports) of a HART master I/O device was also stored in a configuration database. The controller 12 could access the signals on the HART or conventional 4–20 ma I/O devices by simply connecting to the terminals associated with the desired signal within the associated master I/O device or, in the case of the Fieldbus I/O device, by accessing a function block by a tag that was consistent between the Fieldbus network 30 and the controller 12. Configuration data was stored in a configuration database which might be, for example, within one of the workstations 14, and could be accessed by the user in standard manners.

However, for remote I/O device networks, the user would have to manually configure the master I/O device (using standard tools connected to the master device) and would then have to program the controller 12 to be able to communicate with the master I/O device to inform the controller 12 where particular signals associated with particular devices were stored in the master I/O memory and what those signals represented. This process had to be repeated whenever the configuration of the master I/O device was changed, which led to many errors and made adding or changing devices within the Profibus and AS-Interface device networks 34 and 36 time consuming and tedious. Likewise, a user had to re-enter all of the appropriate information pertaining to the Profibus and AS-Interface device networks 34 and 36 in a configuration database to enable a user to see the configuration of these networks. However, this database could not be used to change the configuration of these networks and may not have even been correct if, for example, an error in entering the data was made in the first place. U.S. Pat. No. 5,838,563 to Dove et al. ("System for Configuring a Process Control Environment"), U.S. Pat. No. 5,828,851 to Nixon et al. ("Process Control System Using Standard Protocol Control of Standard Devices and Nonstandard Devices"), U.S. patent application Ser. No. 08/631,519 to Nixon et al. ("Process Control System Including a Method and Apparatus for Automatically Sensing the Connection of Devices To a Network") filed Apr. 12, 1996, and U.S. patent application Ser. No. 08/631,458 to Dove ("System for Assisting Configuring a Process Control Environment") filed Apr. 12, 1996, all of which are assigned to the assignee of the present invention, and all of which are expressly incorporated by reference herein, describe the manner in which configuration, auto-sensing and control of devices within a process control system can be performed using local or specialized I/O device networks.

Figure 2:
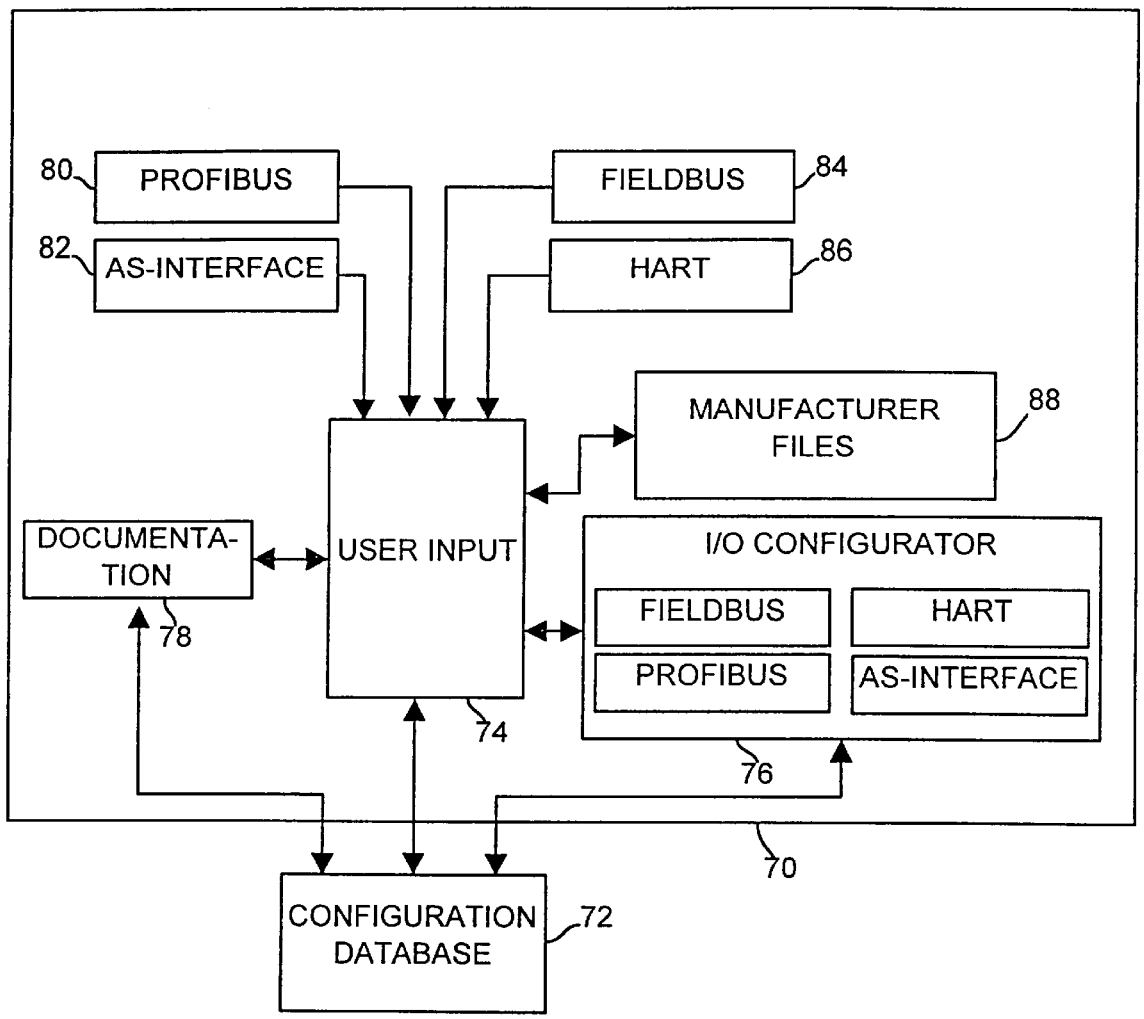
FIG. 2 is a block diagram of a configuration system that accepts information from a user pertaining to local, specialized and remote I/O device networks to configure the local, specialized and remote I/O device networks within a process control system.

FIG. 2 illustrates a process control configuration system or routine 70 which uses a configuration database 72 that stores configuration information for all of the devices within the process control system 10. The configuration system 70 may be stored in, for example, one or more of the memories 20 of one of the host devices 14 and executed on the processor 18 of the host device 14 to configure and document remote I/O device networks, such as the networks 34 and 36, along with local or specialized I/O device networks, such as the networks 30 and 32. The configuration database 72 may be located in any desired memory, such as in one of the memories 20 of the workstations 14 or in a stand-alone memory connected to the bus 16. However, the configuration database 72 must be accessible to the configuration system 70. The configuration system 70 can be used, in conjunction with the configuration database 72, to configure the process control system 10 illustrated of FIG. 1 in a manner which coordinates the configuration and documentation of remote I/O device networks such as the Profibus device network 34 and the AS-Interface device network 36 with the configuration and documentation of conventional I/O device networks, such as the Fieldbus device network 30 and the HART device network 32.

The configuration system 70 includes multiple components, such as software routines that operate together to perform configuration and documentation of the process control system illustrated in FIG. 1. Generally speaking, the configuration system 70 includes a user input section (or a data access or acquisition section) 74 which prompts or otherwise enables a user to input information pertaining to any or all of the devices (and modules, signals, parameters, etc. associated with those devices) within the process control system 10 and the manner in which those devices are connected within the process control system 10. The configuration system 70 also includes a configurator 76 that configures different master I/O devices, such as the devices 44, 48, 55 and 60 of FIG. 1 and a documentation routine 78 that displays documentation pertaining to the current configuration, as stored in the configuration database 72, to a user. The documentation routine 78 also enables a user to manipulate and change the configuration of the process control system 10 as described below and may be used, in conjunction with the user input routine 74 to enable a user to add devices, delete devices, change device configurations, etc.

Generally speaking, the user input routine 70 may be invoked to get configuration data pertaining to any element within the process control system 10 whenever, for example, a device is added to the system 10, a device is moved within the system 10, or is changed in some manner. If auto-sensing of devices is supported in the process control system, the user input routine 74 may automatically present the user with screens or questions related to the devices sensed as being connected to the network 10. If desired, the user input routine 74 may also be invoked whenever the documentation routine 78 is used to make a change to the configuration of the process control system 10, such as by adding a device or changing a device. When invoked, the user input routine 74 automatically prompts the user for the information needed to configure a device or a device network to establish communication or enable communication between a field device and a controller or other device during runtime of the process control system 10 and to document that configuration. If desired, the input routine 74 may create or update a device definition for each of the different devices within the remote I/O network wherein this device definition stores data needed to document and/or configure the device.

To acquire the correct and necessary information pertaining to each of the different devices within a device network, the user input routine 74 may use different network templates 80–86 which store, in any desired manner, the questions or other dialog used by the user input routine 74 to obtain or change device or network information. Because the information needed to configure and document the devices in each of the different device networks, such as the networks 30, 32, 34 and 36 of FIG. 1, each of the templates 80–86 may store different information to be used to acquire different types of data required for or associated with that protocol. In any event, the user input routine 74 uses data stored in templates 80–86 to request the particular information necessary to configure and document each of these different types of device networks and the devices within these networks. While a Profibus template 80, an AS-Interface template 82, a Fieldbus template 84 and a HART template 86 are illustrated in FIG. 2, other templates or interface controls could be used for other device networks. If desired, each of the templates 80–86 may store screens displays, questions, or other data related to any other information needed for each of the different kinds of devices within a related device network, information necessary to configure that network or the devices within that network and information which enables the controller 12 to effectively communicate with the devices in that network. FIGS. 6–25 herein provide example screen displays which may be generated using or stored in the Profibus and AS-Interface templates 80 and 82, although any other desired dialog may be used to get information from the user regarding devices within the process control network.

Thus, as will be understood, the user input routine 74 prompts a user to input, via one of the workstations 14, all of the information needed to configure and communicate with each of the different devices within each of the device networks, including the manner in which the device is connected to the system 10, the type of device and other information necessary for configuring those networks. In some cases, such as with the Profibus device network 34, the input routine 74 may enable the user to provide a GSD file or other device manufacturer file (such as a device description) to the configuration system 70 and obtain information from the GSD file for that device. The GSD or other manufacturer files may be stored in a manufacturer file storage 88 or, alternatively may be stored in the configuration database 72 or in any other desired location. If a GSD file already exits for a device, or after such a file has been provided to the configuration system 70, the input routine 74 may use the information within the GSD file to fill out or provide default values for some of the data needed to configure the Profibus network, i.e., some of the data needed to fill out the templates stored in the Profibus configuration template 80. Of course, other manufacturer files may exist for other types of I/O networks and devices and these files can be used to make the task of providing device information to the configuration routine 70 more simple.

Figure 3:
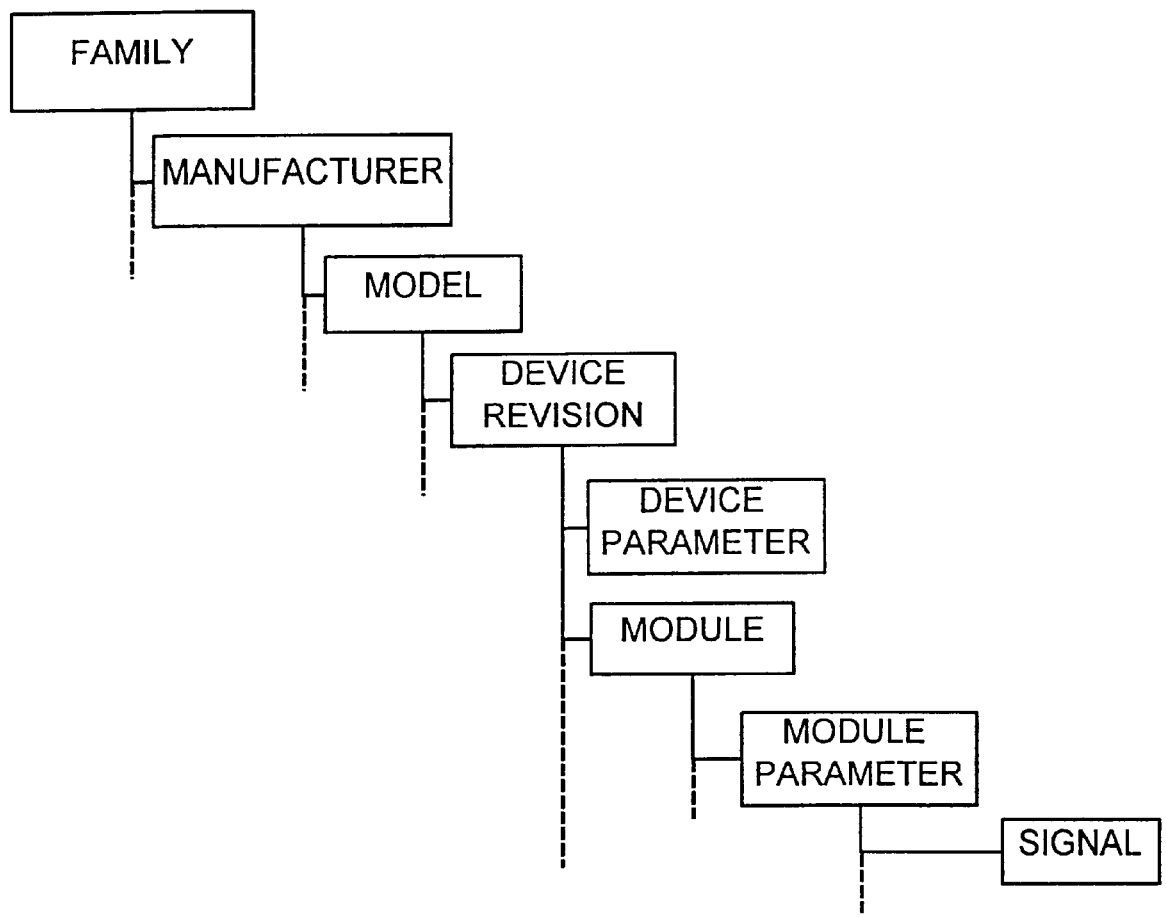
FIG. 3 is a block diagram of a portion of a signal object database used in a process control configuration system of the process control system of FIG. 1.

After acquiring the necessary information for a particular device, the user input routine 70 stores the received information in the configuration database 72 which may, for example, be an object-oriented database that stores information pertaining to each of the devices within the process control system 10 in an object type structure. While the object format of the object oriented database 72 may be any desired format, this object format generally should be based on the logical arrangement of devices and units within the devices associated with each device network. Of course, the object format may differ for each of the different types of device networks attached to the system 10. Thus, an object may be created for each device within each device network, and sub-objects pertaining to device modules, function blocks, signals, etc. associated with those devices may be provided for each such device object. Typically, the user input routine 74 and the templates for a particular device protocol will be configured to obtain the information stored in the configuration database 72 for each device, such as the information associated with each object within the object-oriented framework of the configuration database 72. For example, as illustrated in FIG. 3, the object structure for Profibus devices may include a family object, identifying a family of Profibus devices, a manufacturer sub-object, identifying a device manufacturer, a model sub-object, identifying a model of a device of a particular device manufacturer, and a revision sub-object, identifying a device revision associated with a device model. Each device revision may have one or more device wide parameter sub-objects, defining parameters associated with the device. Likewise, each device revision may have one or more module sub-objects associated therewith. Similarly, each module may have one or more module parameter sub-objects and each module parameter may have one or more signals sub-objects associated therewith. While only one box for each type of object is illustrated in FIG. 3, each family may have multiple manufacturers, each manufacture may have multiple models, each model may have multiple device revisions, etc.

Likewise, an AS-Interface network, such as the network 36 of FIG. 1, may be organized using an object structure including, for example, an object for each AS-Interface device type, and sub-objects related to devices of a device type and the signals (such as discrete I/O signals) and parameters associated with each of those devices. Of course, each object may include or store information pertaining to that object. For example, device objects may store configuration and parameterization information such as configuration and parameterization data strings for that device, a description of the device, manufacturer information, user assigned tags, such as signal tags, etc. Likewise, module and signal objects may include description, tag, and other information pertaining to those units. Some of the particular information that may be acquired and stored for Profibus and AS-Interface network objects is described in more detail hereinafter with respect to FIGS. 6–25. Likewise, the objects for any device network may be organized in any other desired hierarchy according to the present invention. Of course, the configuration database 72 may also include objects pertaining to Fieldbus devices, HART devices, 4–20 devices and any other devices within the system 10 and these objects may be the same or similar to those used in object databases currently in use within process control systems such as DeltaV system. For example, the Fieldbus devices may have configuration information pertaining to a manufacturer, a device type, a revision, function blocks, communication relationships, execution times and indexes of the function blocks, number of function blocks or any other information associated with each Fieldbus device and this information may be stored as a device definition for each Fieldbus device in the configuration database 72. HART devices may have configuration information pertaining to, for example, a manufacturer, a device type, a revision, a description, default variables, device identification information, diagnostic commands, default values, or any other information associated with a HART device and this information may be stored as a device definition for each device in the configuration database 72.

Referring again to FIG. 2, the configurator 76, which may be implemented after the user enters information pertaining to one or more of the devices within a particular device network, when the user wishes to download a control scheme to a controller, when a user wishes to establish a communication link to a device on a device network, or at any other desired time, is implemented to configure a device network and to thereby enable communication between the controller 12 and one or more devices within a device network. Generally speaking, the configurator 76 is used to configure the I/O device associated with a particular device network such as master I/O device 55 of the Profibus network 34 or the master I/O device 60 of the AS-Interface network 36 using the information stored in the configuration database 72. The configurator 76 may store and use a different configuration routine for each of the different types of device networks to be configured. FIG. 2, for example, illustrates a configurator 76 having a different configuration routine for each of a Fieldbus, HART, Profibus, and AS-Interface device network. Of course, any desired configuration routine for these different device networks may be used, it being understood, however, that this configuration routine uses the information input by the user pertaining to the device network via the user input 74 and/or as stored in the configuration database 72. After configuring, for example, the Profibus master I/O device 55 to enable communication between the controller 12 and the Profibus devices 50–52, the configurator 76 may use a different configuration routine to configure the AS-Interface I/O device 60 and, if necessary, one or more still different configuration routines to configure the Fieldbus master I/O device 44 and the HART master I/O device 48 using the information stored in the configuration database 72 about the devices within these networks. Of course, the configuration routines used to configure the Profibus I/O device 55, the AS-Interface I/O device 60, etc. can be similar to or the same as those currently used to configure these devices independently with the understanding that the configuration information must be communicated to the controller 12 which then uses this information to configure the appropriate I/O device in any known or desired manner.

Thus, for example, the configurator 76 may use a configuration routine associated with, for example, the Profibus device network 36 and the information input by the user and stored in the configuration database 72 pertaining to each of the Profibus devices 50–52 connected within the Profibus network 34 to the select the memory locations within the I/O device 55 used to send data to and to receive data from each of the Profibus devices 50, 51 and 52. Likewise, the configurator 76 may assemble and store the parameterization data and the configuration data needed to configure each of the devices 50–52 within the Profibus network 34 in the memory of the Profibus master I/O device 55 to enable the Profibus device network 34 to operate. This data may also be stored within the controller 12, if desired. Memory information pertaining to the manner in which the Profibus master I/O device 55 has been configured, i.e., where the signals for each device are stored in the Profibus master I/O device memory, may also be stored in the configuration database 72 and be made accessible to the controller 12 to be used to communicate with the master I/O device 55 to effect communication with a device during runtime. If desired, this memory information may be provided to the controller 12 when the Profibus master I/O device 55 is configured or when a control routine using a particular signal that must be read from or read to the Profibus master I/O device 55 is downloaded to the controller 12. In this manner, the user only inputs the information pertaining to the Profibus devices 50–52 once and this data is stored in the configuration database 72 and is used to configure the Profibus device network 34, to enable the controller 12 to communicate with the devices within that network via the Profibus master I/O device and to document the configuration of the process control system 10.

It should be noted that the configuration information pertaining to the signal tags, etc. associated with each of the signals stored in the Profibus master I/O memory is automatically provided to the controller 12 so that the controller 12 can access the correct the memory location within the master I/O device 55 and assign a signal, module tag, device tag or name to that data (such a tag being specified by the configuration database 72) in a manner that allows that data to be used in any convenient manner by the controller 12. In other words, the controller 12 is provided with enough information to interpret the data stored in each of the memory locations of the Profibus master I/O device 55 to use that data in the same manner that it uses data or signals received from any other conventional I/O device network, such as the Fieldbus device network 30 or the HART device network 32. Likewise, the controller 12 can send data or signals to a particular device or module within the Profibus device network 34 by placing the data to be sent in the appropriate memory location of the I/O master device associated with that device network. If desired, these memory locations associated with the Profibus or other device I/O network may be stored in the configuration database 72 and used to specify how the controller 12 should communicate with these devices when a control routine is downloaded to the controller 12.

Figure 4:
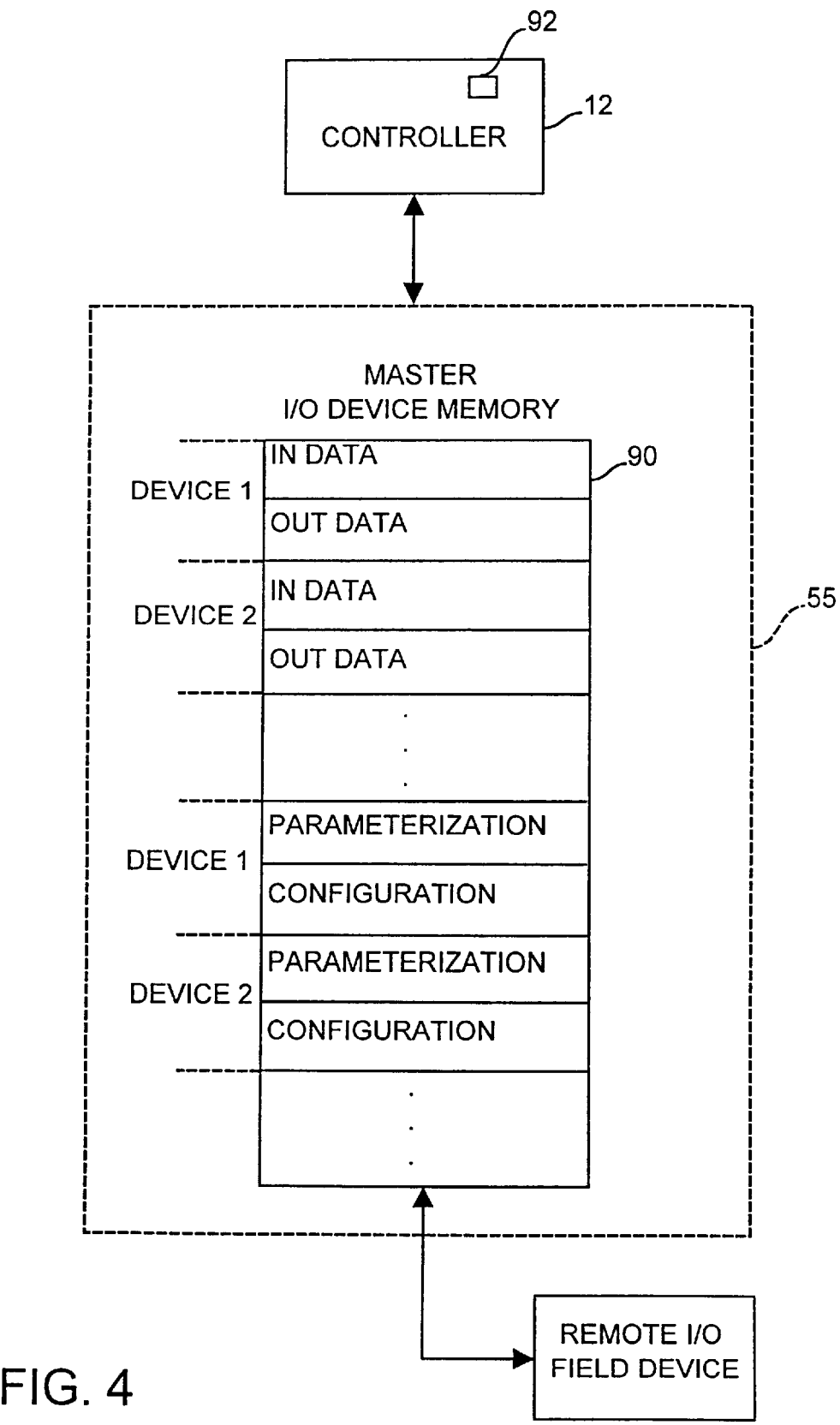
FIG. 4 is a block diagram of a shared memory used in a master I/O device of FIG. 1.

Referring to FIG. 4, a memory 90 which may be, for example, a memory within the master I/O device 55 for the Profibus network 34 is illustrated. In this case, the configurator 76 assigns particular memory locations for storing each of the signals to be sent to and received from each of the devices connected within the Profibus device network 34. These memory locations are illustrated as being labeled with In Data or Out Data for each of Device 1, Device 2, etc. which are the devices 50, 51, etc. connected to the Profibus device network 34. Of course, the configurator 76 selects these memory locations to assure that there is enough storage space for all data within the concatenated string of data sent to a device (Out Data) as well as for all of the data within the concatenated string of data received from a device (In Data) which, of course, depends on the type of device, the number of modules associated with the device, the number and kind of signals associated with each module, etc. All of this information, however, is input by the user either directly via requests by the user input section 74 or based on information within the manufacturer file 88 associated with the device, and is stored in the configuration database 72. Similarly, the parameterization and configuration data that is needed to parameterize and configure each of the devices when the Profibus device network 34 is determined by the configurator 76 and is placed within the memory 90 at particular memory locations to be used by the master I/O device 55 to establish communications with each of the different devices within the Profibus device network 34. A memory map 92 may be stored in the controller 12 to enable the controller 12 to interpret each of the signals within the memory 90 of the master I/O device 55, and this map 92 may include signal tag information, etc. which may be needed by the controller 12 when implementing a process control routine. Likewise, the memory map 92 may provide the controller 12 with the information necessary to decode the data string information within the memory 90 and to place information within the memory 90 in the proper data string format to be sent to one of the Profibus field devices 50–52 connected to the Profibus network 34. Of course, a similar type of memory mapping may be performed in the AS-Interface master I/O device 60, although the specifics will be different due to the fact that the AS-Interface protocol uses four bit signal strings as well as different kinds of configuration data strings.

Of course, the configurator 76 performs any necessary functions to configure the remote I/O master device to communicate the necessary information pertaining to, objects, devices or signals associated with the remote network to the controller 12 and vice versa. Thus, the configurator 76 may establish memory maps for a remote I/O device to map information associated with devices or signals within a remote network to signals used within the controller 12. The configurator 76 may also establish or set up communication objects within the master I/O device to automatically send data received from devices to the controller 12 when, for example, a change in the data is detected. The specifics of configuring a master I/O device, while different for different protocols, are well known in the art and so will not be described further herein, it being understood, however, that this configuration is automatically performed by the configurator 76 when the rest of the system is configured or when the user inputs new information pertaining to a remote network or at any other appropriate or desired time.

Of course, similar configuration activities can be preformed for the AS-Interface master I/O card 60 using data entered pertaining to the AS-Interface devices 62–65 of FIG. 1, to the extent necessary. In fact, because the AS-Interface protocol is more simple, the configurator 76 may need only to map data into and out of the AS-Interface master I/O device 60 for use by the controller 12 during runtime and, for example, store the indications of these memory locations in the controller 12 or in the configuration database 72. The configurator 76 may also determine the device profile (i.e., the I/O configuration code and the identification code) for each AS-Interface device from, for example, the device definition created for the device and provide this information to the AS-Interface master I/O device. The AS-Interface master I/O device then polls each AS-Interface device for its configuration code, compares that code to the code provided by the configurator 76 and, if they match, sends the device parameters to the AS-Interface device and begins communicating with that device.

Referring again to FIG. 2, the documentation routine 78 can be used to view the current state of the process control system 10 based on the data stored in the configuration database 72 or may be used in conjunction with the user input routine 74 to specify a configuration or change a configuration of the process control system 10. The documentation routine 78 may display the devices and other network information stored within the configuration database 72 in any desired manner, such as using a windows-explorer-type tree set-up, as currently performed by the DeltaV controller system. However, other manners of documenting and displaying documentation pertaining to the setup of the process control network 10 can be used as well.

An example documentation tree or structure indicating a hierarchal view of the devices and other elements connected within the process control system 10, which may be created by the documentation routine 78, is illustrated in FIGS. 5A and 5B. The hierarchical network of FIGS. 5A and 5B illustrates a system that includes remote I/O device networks as well as local or specialized I/O device networks. The hierarchal structure illustrated in FIGS. 5A and 5B includes a library, which typically exists in the configuration database 72 in which different device configurations, device definitions or objects related thereto, such as Fieldbus devices, HART devices, Profibus devices and AS-Interface devices which have been previously configured or created are stored. As is already provided in, for example, the DeltaV hierarchy, Fieldbus devices are illustrated as categorized as having a manufacturer, device type, device revision, function blocks within a device, names of function blocks, execution times and indexes of the function blocks within the device. Similarly, HART devices are illustrated in FIG. 5A as categorized according to manufacturer and device type. Each device type may have one or more device identifiers, and each device may have a description and special diagnostic commands associated therewith. Of course, other configuration information may be provided about Fieldbus or HART devices (or other types of devices) within the Library. In accordance with the present invention, the Profibus devices (which may be the devices 50–52 of FIG. 1), may be categorized as falling within a family of devices (only FAM1 of which is illustrated in FIG. 5A) and each family of devices may include one or more manufacturers (only MAN1 is illustrated in FIG. 5A). Models (only MODEL1 is illustrated) may be associated with a manufacturer to further categorize the Profibus devices. Likewise, each model of a device may have one or more device revisions (REV1 illustrated) and each device revision may have one or more device wide parameters associated therewith (PARAM1 illustrated). A device-wide parameter can be used to define parameters associated with a Profibus device that are of different types than those already recognized by the controller system in other devices. Likewise, each device revision may have one or more modules associated therewith (MODULE1 illustrated). Modules refer to particular kinds of cards that are within Profibus devices. Furthermore, each module may have one or more module parameters (PARAM2 illustrated) which, again, define new types of parameters associated with Profibus modules and may have zero or more signals associated therewith. These signals are the actual inputs to or the outputs from the device or module of a device. As will be understood, the documentation hierarchy of FIGS. 5A and 5B for Profibus devices may follow or be organized under the object structure defined for Profibus devices, such as the one in FIG. 3.

Similarly, the Library of FIG. 5A may include an indication of one or more of the AS-Interface devices connected within the system, as illustrated in FIG. 5A. The AS-Interface devices may be categorized according to ASI device type, (only DeviceType1 is shown in FIG. 5A). Of course other categorizations could be provided also, such as manufacturer, device revision, etc. associated with AS-Interface devices.

The hierarchy of FIG. 5B includes a System Configuration section that illustrates the manner in which the devices are physically connected within the control system 10. For example, the System Configuration may have a Physical Network section, under which a Control Network section indicates the manner in which the controllers are set up to control different devices and device networks. Under the Control Network section, one or more controllers may be listed. Controllers may include control routines (not shown but usually referred to as assigned modules) therein and, associated with each controller, an I/O section may define the devices connected to the controller and with which the controller communicates to perform I/O activities. Each different type of device network may have its own I/O entry. A Fieldbus I/O card which corresponds to the Fieldbus master I/O card 44 of FIG. 1 has Fieldbus devices labeled D01–D04 connected to a port P01 thereof, and these devices correspond to the devices 40 of FIG. 1. Each of these devices may have function blocks associated therewith. A HART I/O card which corresponds to the HART master I/O card 48 of FIG. 1 has HART signals (from HART devices) labeled with signal tags SignalTag1, SignalTag2 and SignalTag3 connected to channels (usually wire terminals) C1, C2 and C3, respectively. Other information pertaining to these devices or signals, such as a device description may be displayed also.

Likewise, a Profibus card, which corresponds to the Profibus master I/O card 55 of FIG. 2 has devices attached thereto via a port P01. In particular, Profibus devices (only PBDEV1 which corresponds to, for example, Profibus device 50 of FIG. 1 is illustrated in FIG. 5B) are connected to the controller 12 via the Profibus card. Under each device, the device wide parameters for that device may be shown and the slots associated with the device may be shown. According to the present invention, each slot is a placeholder for a module associated with a device and slots are used for Profibus devices because modules within modular devices may be moved around between stationary slots. Thus, in the case of modular Profibus devices, the modules may be moved between slots but the slots themselves are fixed. In the case of fixed devices, the slots will always include the same module. Under each slot, in which a module of a Profibus device will be attached, the Profibus or slot parameters associated with the module in that slot are illustrated, as well as the signals associated with the module in the slot. Each signal includes a signal name and, under each signal, a DST for that signal is indicated. The DST is typically assigned by the user via the configuration system 70 (but can be assigned automatically when the device definition have the signal is created) and is used by the controller 12 or other devices to identify the signal when that signal is retrieved from or place into a memory location within the Profibus master I/O device 55. Of course, it will be understood that more signals, slots, parameters, devices, cards, etc. could be attached to the controller and shown in the hierarchy of FIG. 5B. In particular, a different Profibus device entry for the devices 51 and 52 of FIG. 1 would be shown as attached to port P01 in the hierarchy of FIG. 5A. Likewise, the device entry for the device 51 would include two slots, each having parameters, signals and DSTs associated therewith while the device entry for the device 52 would have three slots, each having associated parameters, signals, and DSTs. Of course, all of this information may be provided by the user via the user input routine 74 of FIG. 2 when the user adds devices to the system, sets up the system or otherwise configures the system and is stored in the configuration database 72.

Similarly, the AS-Interface device network 36 attached to the controller 12 of FIG. 1 includes the AS-Interface master I/O card 60 attached to, for example the controller 12. As illustrated in FIG. 1, this card has four AS-Interface field devices attached thereto and each device may have ASI Discrete I/O inputs and/or outputs associated therewith (up to four). This information is illustrated in the hierarchy of FIG. 5B in which one of the devices 62–64 (named ASDEV1) is illustrated as being attached to port P01 of the AS-Interface card, and as having a two ASI discrete I/O signals called InputD1 and InputD2 with DSTs associated therewith. Of course, the information needed to create the documentation hierarchy of FIGS. 5A and 5B is stored in the configuration database 72 and is obtained via user input via the input routine 74 prior to configuration of the system 10.

While the configuration information illustrated in the hierarchy of FIGS. 5A and 5B may be obtained in any desired manner by the user input routine 74, in one embodiment, the user input routine 74 may use the screens illustrated in FIGS. 6–25 to prompt the user for the information pertaining to the different devices within each of the Profibus and AS-Interface device networks and may create device definitions for the devices from the information in these screens for the different kinds of devices. If desired, other information about each of the devices in the hierarchy of FIGS. 5A and 5B, such as any of the other information within a device definition created a device and stored in the configuration database 72 may be displayed for the device when, for example, a user selects the device.

The screens of FIGS. 6–25, as well as other screens, may be created and modified using a windows-type format with standard windows-type commands, although any other format could be used as well. Some of the information, such as the information which is specified by a GSD or other manufacturer file, like a device description file, or which is related to times and users, is not user changeable and this information is illustrated in the screen displays of FIGS. 6–25 as non-user changeable, i.e., outside of an edit field. It will be understood that the screen displays, or information required to create these or similar displays, may be stored in the templates 80 and 82 of FIG. 2 and may be used by the user input routine 74 to acquire data pertaining to the devices within the device networks 34 and 36. The tables provided below also specify more clearly one possible format of the information which may be acquired for each device to configure a device network and to document that network, as well as how that information may be obtained for each of the entries. It will be understood, however, that this same information or other information may be obtained by the configuration routine 70 in other formats, other data types, etc. as well as from other sources, if so desired. Also, any or all of this information may be stored as a device definition for the appropriate device.

The screen displays of FIGS. 6–15 relate to the entry of information in a Profibus network or devices while the displays of FIGS. 16–25 relate to the entry of information for an AS-Interface network or devices. Generally speaking, the user input routine 74 may be used in conjunction with the documentation routine 78 so that a user may display a configuration hierarchy such as that of FIGS. 5A and 5B, select a component within that hierarchy and then create new elements or edit existing elements within that hierarchy using the user input routine 74. The information input by the user or otherwise obtained from, for example, a manufacturer file, may be used to create or update a device definition for a Profibus or AS-Interface device. Thus, for example, the user may select a family within the hierarchy of FIG. 5A under the Profibus devices entry and enter a new manufacturer, model, revision, module etc. associated therewith to generally provide information about this new element. During this time, the user input section 74 may provide, in sequence, all of the screens associated with each of these elements to obtain all of the information pertaining to these elements. The new family, device, etc. as provided by the user and the GSD or other file is then stored in the library portion of the configuration database 72. Likewise, the user may select a Profibus card, device, slot, module, signal, etc. beneath the System Configuration section of FIG. 5B to specify or define an actual device, slot, module, signal, etc. that is connected within the system to the port, controller, etc. specified in the hierarchy. In this manner, the System Configuration section documents the actual physical configuration of the system while the library stores information pertaining to general devices, but not actual or specific instances of these devices within the process control system 10. The hierarchy of FIGS. 5A and 5B may also have system components, defining the actual components, such as software components or control components which may be placed in devices such as controllers, etc.

Figure 6:
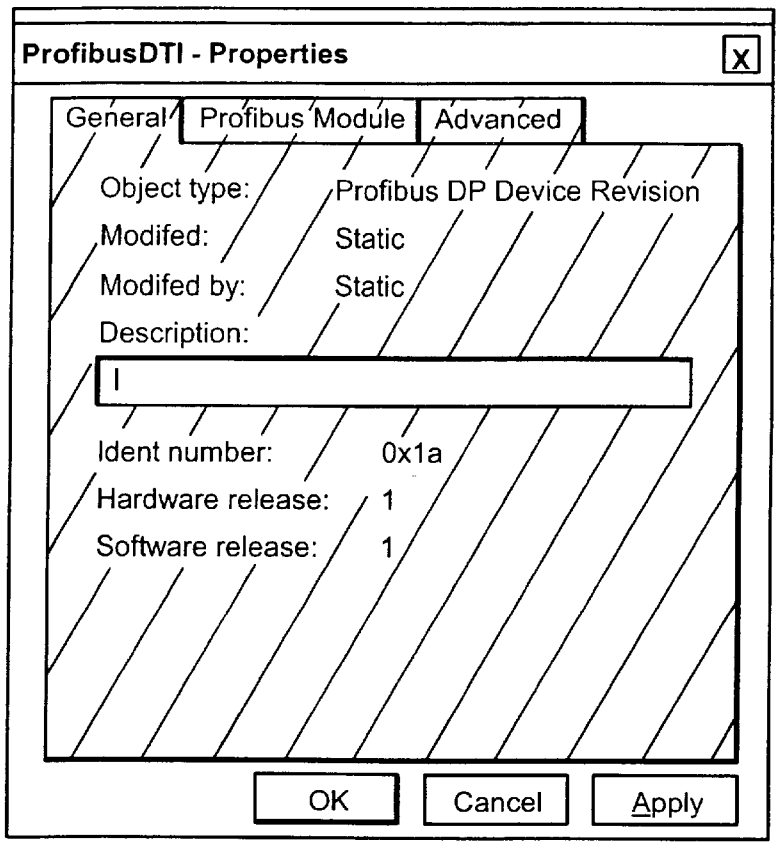
FIGS. 6–15 are example screen displays used by the configuration system of FIG. 2 to enable input, configuration and documentation of Profibus device network elements in the process control system of FIG. 1.

If, for example, the user selects or creates a device revision for a Profibus device in the hierarchy of FIG. 5A, the user input section 74 may automatically provide the screen of FIG. 6, which illustrates a first general page of a Device Revision object dialog. Here, the user can provide a description of the device revision while the user input routine 74 accesses the GSD file to obtain the object type, the identification number, and the hardware and software release of the device revision. As illustrated in FIG. 6 and the Table 1 below, the description can be provided by the user via the user input section 74 of FIG. 2 (via an edit box on the screen) while the rest of the information may be non-editable and provided from a GSD file or from the configuration system 70 based on the user and the time at which the changes are being made. Table 1 below defines the information in the screen display of FIG. 6 more particularly.

TABLE 1

General Page of Device Revision Properties Dialog

| Name | Type | Min | Max | Default | Content |
|---|---|---|---|---|---|
| Object type | static | n/a | n/a | Profibus DP Device Revision | Component type |
| Modified | static | n/a | n/a | Today's date | Date last modified |
| Modified by | static | n/a | n/a | Current User | User who modified this object |
| Description | edit | n/a | n/a | None | Description of component |
| Indent number | static | n/a | n/a | None | Device indent number from GSD file |
| Hardware release | static | n/a | n/a | None | Hardware release string from GSD file |
| Software release | static | n/a | n/a | None | Software release string from GSD file |

Figure 7:
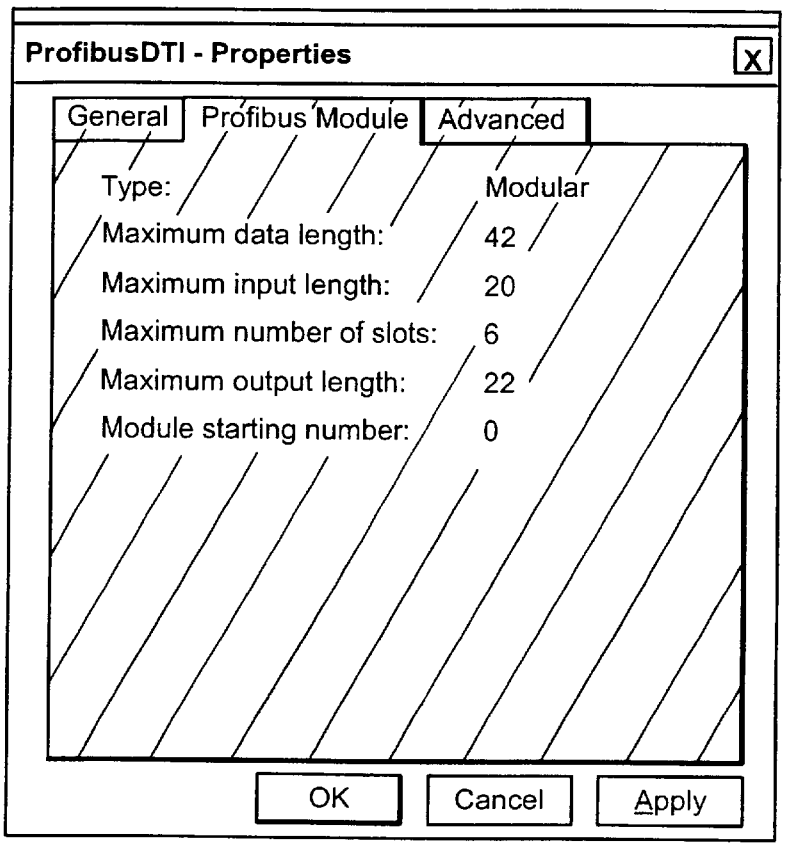

Next, the user may select a device revision properties dialog, such as illustrated in FIG. 7 which may be then used to define a module within a particular Profibus device. Table 2 again defines the information acquired by the user input section 74 more particularly and, it will be noted, that all of the information therein can be obtained from the GSD file for the device.

TABLE 2

Module Page of Device Revision Properties Dialog

| Name | Type | Min | Max | Default | Content |
|---|---|---|---|---|---|
| Type | static | n/a | n/a | None | Device type (Compact or Modular) |
| Maximum data length | static | n/a | n/a | 0 | Maximum amount of data which can be read from or written to device in one message exchange |
| Maximum input length | static | n/a | n/a | 0 | Maximum amount of data which can read from device in one message |
| Maximum number of slots | static | n/a | n/a | 0 | Maximum number of slots in a device |
| Maximum output length | static | n/a | n/a | 0 | Maximum amount of data which can written to a device in one message |
| Module starting number | static | n/a | n/a | 0 | The first module in the device will start with this number |

Similarly, the window displays of FIGS. 8–15 may be provided to a user by the user input routine 74 when it recognizes that the user is specifying a new device, or element of a device within the hierarchy (which is related to a device within the process control system 10). Of course, some of this information, such as signal names or DSTs may be provided by the user when a device or other element is actually placed in the System Configuration section of the hierarchy of FIG. 5B, i.e., when documentation pertaining to an actual device connected within the system is needed.

Figure 8:
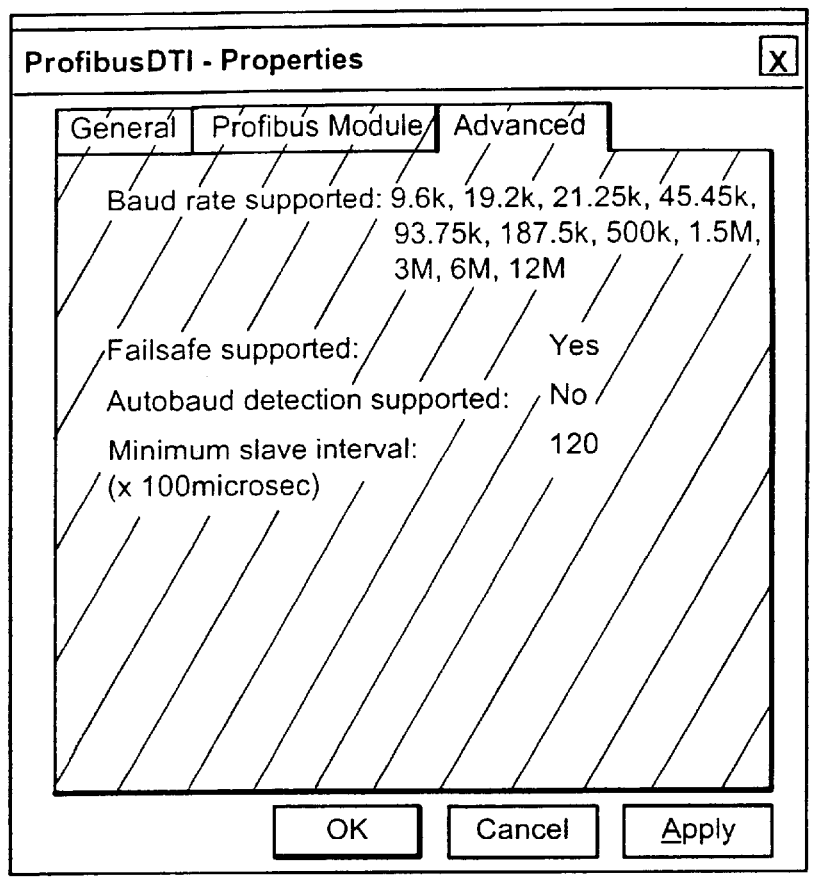

FIG. 8 illustrates an advanced page of a device revision properties dialog containing information pertaining to baud rates, failsafes, etc., all of which can be obtained by the user input routine 74 from the GSD file for a particular device. Table 3 provides more information pertaining to this data. It will be understood that the user can select the appropriate screens and use the edit fields therein to input the data not otherwise available to the user input routine 74 from, for example, the GSD file. When entered, this data may be stored in the configuration database 72 for the device.

TABLE 3

Advanced Page of Device Revision Properties Dialog.

| Name | Type | Min | Max | Default | Content |
|---|---|---|---|---|---|
| Baud rate supported | static | n/a | n/a | None | List of baud rates supported by the device |
| Failsafe supported | static | n/a | n/a | No | Is failsafe supported by the device |
| Autobaud detection supported | static | n/a | n/a | 0 | Is autobaud detection supported by the device |
| Minimum slave interval | static | n/a | n/a | 0 | The minimum slave interval in hundreds of microseconds |

Figure 9:
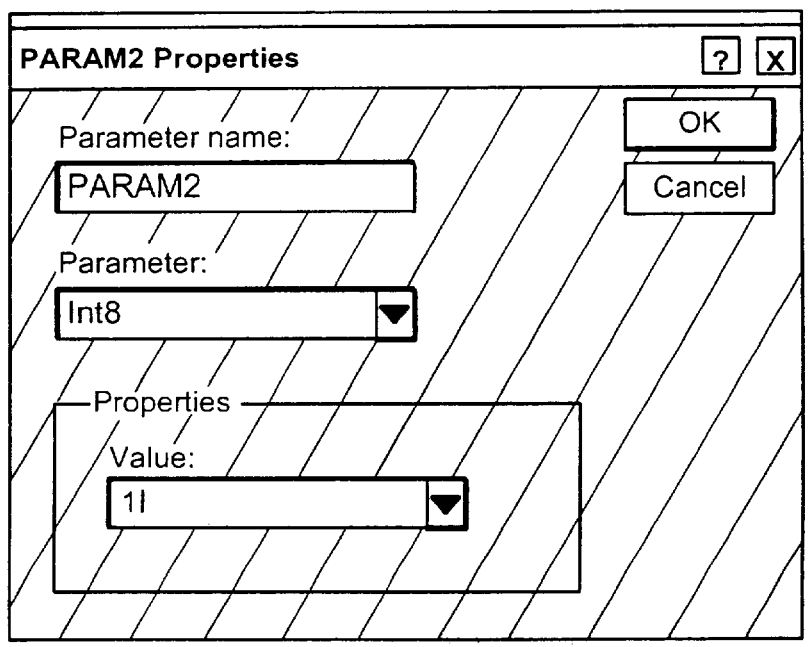
Figure 10:
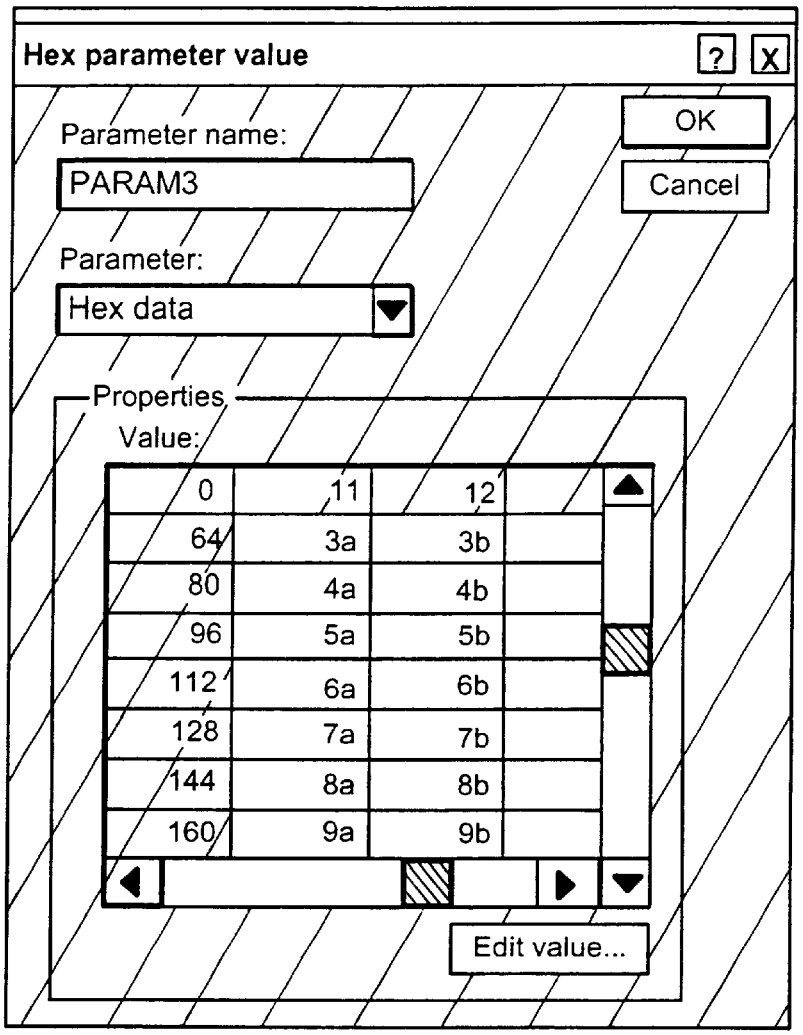

FIG. 9 illustrates a page of a Device Revision Parameter dialog box used to define or describe a device revision parameter for a particular device revision. Of course, a similar box could be used to define a module parameter or a slot parameter of a Profibus device. The actual type of parameter may be any desired type including, for example, an integer, a whole number, a real number, an enumerated value, hexidecimal data, an array of any size or dimensions, etc. Table 4 below provides information pertaining to the definition of integer, enumerated and hexidecimal parameters while FIG. 10 illustrates a hexidecimal data parameter named PARAM3 in which the value field uses a grid control, such as the MS Grid Control provided by Microsoft.

TABLE 4

Parameter Properties

| Name | Type | Min | Max | Default | Content |
|---|---|---|---|---|---|
| Parameter name | Edit | n/a | n/a | None | The name of the parameter |
| Parameter Value | Combo Edit or MS Grid Control | n/a | n/a | None | Type of parameter |
|  |  | n/a | n/a | None | Value for parameter (integer, real, enumerated, hex, etc.) |

Figure 11:
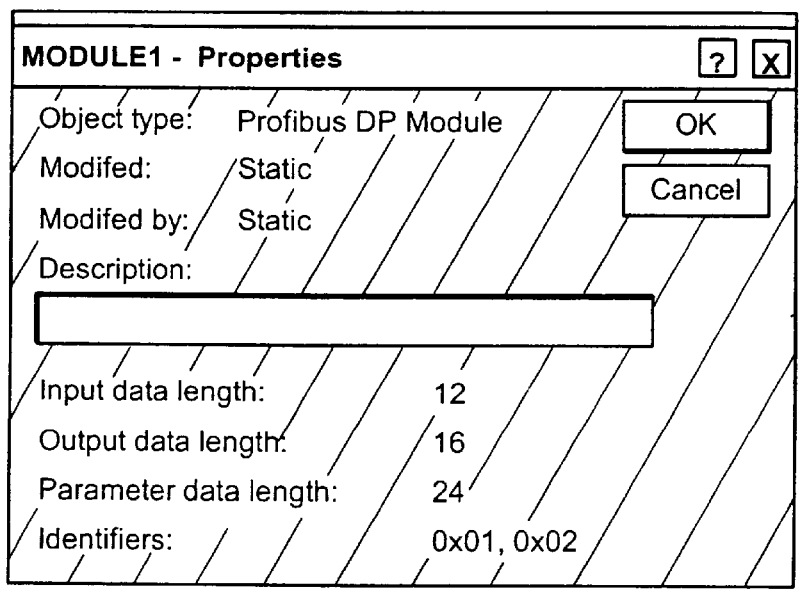

FIG. 11 illustrates a screen used to create or edit a Profibus DP module while Table 5 provides a listing of the properties defined for such a module. Again, each of the fields with a static type may be obtained from a GSD file for the device or based on the current operating conditions of the system (time, user, etc.)

TABLE 5

DP Module Properties Dialog

| Name | Type | Min | Max | Default | Content |
|---|---|---|---|---|---|
| Object type | static | n/a | n/a | Profibus DP Module | Component type |
| Modified | static | n/a | n/a | Today's date | Date last modified |
| Modified by | static | n/a | n/a | Current User | User who modified this object |
| Description | edit | n/a | n/a | None | Description of component |
| Input data length | static | n/a | n/a | None | Number of bytes in input messages |
| Output data length | static | n/a | n/a | None | Number of bytes in input messages |
| Parameter data length | static | n/a | n/a | None | Number of bytes in parameter data |
| Identifiers | static | n/a | n/a | None | List of identifiers which can be 1–17 bytes in size |

Figures 12, 13:
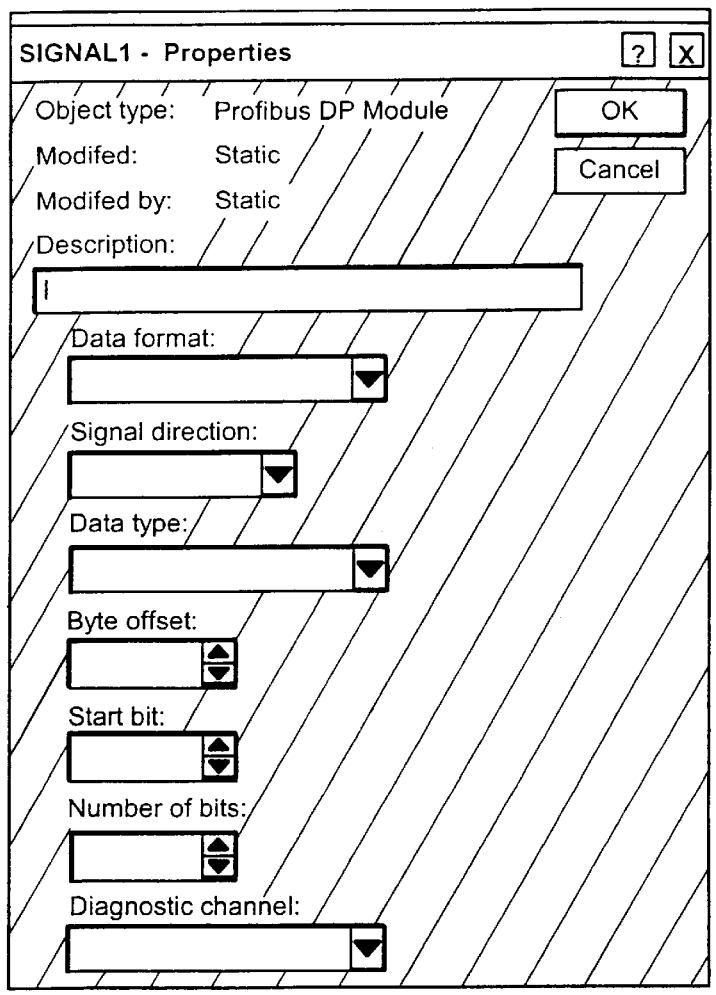

Similarly, FIG. 12 illustrates a screen enabling a user to create or edit a Profibus signal within or associated with a module or a slot while Table 6 provides information pertaining to the properties of such a signal. Each signal will have its own DST. Generally speaking, the following data can be specified for each Profibus device signal. 1) The signal direction, i.e., process input or output. Bidirectional signals generally can be configured as separate DSTs. 2) The data type of the signal value including the set of data types supported and, where appropriate, the big-endian and little-endian formats that will be supported for the signal (i.e., the byte order of the signal when it is a multiple-byte signal). 3) The location of signal value within the data string provided to/from a module. Typically, this information can be in the format of a byte offset and, in some cases, an additional bit number within the byte. If the module containing the signal has more than one Profibus-DP identifier associated therewith, the byte offset may be with reference to the whole module, not a specific identifier. 4) The name for the signal. This is the name that appears in the hierarchy (such as that of FIG. 5B) and is distinct from the DST, which is the tag for a particular signal used by, for example, the controller 12 when performing control with the signal. The name is especially useful for signals from a complex device such as a variable speed drive. 5) The Profibus-DP channel number. This information is useful for diagnostics and signal status generation but is generally optional, as some signals might not have device diagnostic support. If the module containing the signal has more than one identifier associated with it, the position of the identifier within this module (first, second, third, etc.) must also be specified because the diagnostic message specified by the Profibus-DP protocol supplies the diagnostic information on an identifier/channel basis.

TABLE 6

Signal Properties Dialog

| Name | Type | Min | Max | Default | Content |
|---|---|---|---|---|---|
| Object type | static | n/a | n/a | Profibus Signal | Component type |
| Modified | static | n/a | n/a | Today's date | Date last modified |
| Modified by | static | n/a | n/a | Current User | User who modified this object |
| Description | edit | n/a | n/a | None | Description of component |

TABLE 6-continued

Signal Properties Dialog

| Name | Type | Min | Max | Default | Content |
|---|---|---|---|---|---|
| Data format | combo | n/a | n/a | big endian | Either big or little endian format |
| Signal direction | combo | n/a | n/a | Input | Either input or output |
| Data type | combo | n/a | n/a | Integer 8-bit (Int8) | Int8, Int16, Int32, Unit8, Unit16, Unit32, Bit field |
| Bye offset | edit w/spin | 0 | 256 | 0 | Byte offset of signal from beginning of message |
| Start bit | edit w/spin | 0 | 16 | 0 | If the data type is bit field then this edit is enabled and it represents the offset in bits from the start of the message where the field begins |
| Number of bits | edit w/spin | 0 | 16 | 1 | Size of bit field in bits |
| Diagnostic channel | combo | 0 | 256 | None | Diagnostic channel number |
| Identifier index | edit w/spin | 0 | 256 | 0 | Index of identifier to which diagnostic channel belongs |

Of course, it is desirable to reuse signal descriptions for multiple instances of the same module. As a result, it may be desirable to enable a user to build a list of signals as the default for a particular module in the device type library (such as the Library of FIG. 5A), and then to modify the signal descriptions (or add or delete signals) when a module instance is configured down in the System Configuration portion of the hierarchy.

The user may also create or edit the properties of a device by entering the device properties. The user may select a device underneath a port, or may install a device as being attached to a port and then enter a properties device dialog such as that illustrated above. The device properties are the same as the device revision properties with the addition of an address field, a watch dog timer enable and, if enabled, the value for the watch dog timer. It is assumed here that the Profibus card has been installed and created in the configuration database (or has been auto-sensed). If so, the user can select a port underneath the card and then enter data for a new device attached to that port. The configuration system 70 may ask for a device revision, manufacturer, etc. and, if data pertaining to such a device is available, such as from a GSD file for the device, the new device appears on the screen and the user is prompted to enter data not available for the new device. If the device is not compatible with the port setting, the user may be notified because the device may not be installable. If the device revision is a compact device, then all the necessary slots and parameters are created immediately underneath the device based on the GSD file information. The device address may be set to the next available address if desired. Of course, the user may edit the properties of the device as desired.

Figure 14:
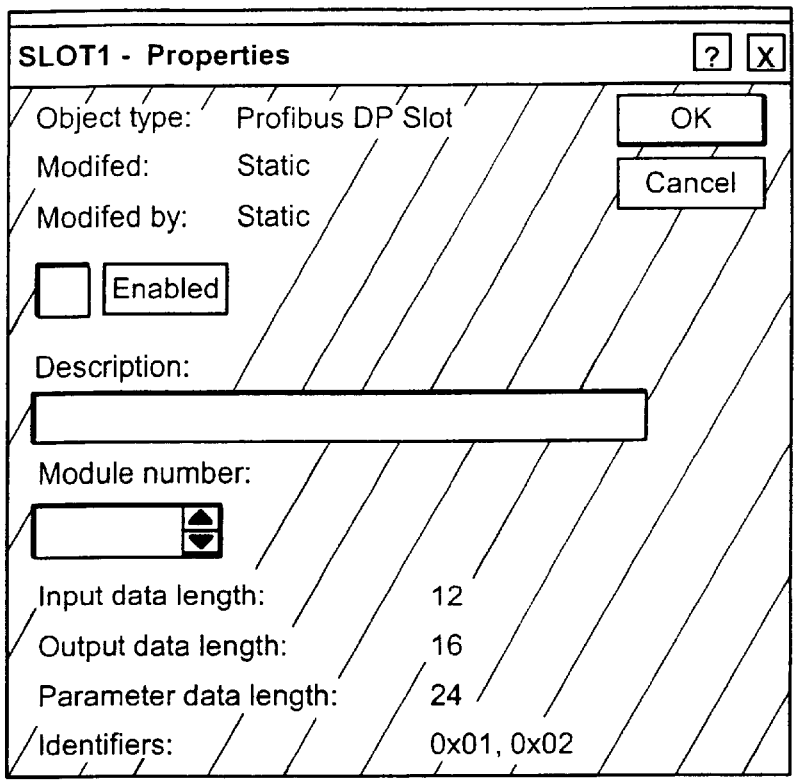

If the device is a modular device, the user may create one or more slots as associated with the device. The configuration system 70 may provide the user with a list of module names for use in the slot (as provided by the template 80 or a manufacturer file 88). The user creates any number of slots up to the limit of the number of slots, the total input length, the total output length, the total length and the total parameter length. The size of a slot with multiple identifiers is determined by the sum of the identifiers and the limit on the configuration size (which applies to all modules). FIGS. 13 and 14 illustrate screens associated with the creation or editing of modules and slots for a modular device while Tables 7 and 8 below provide information related to the different properties of the modules or slots. The Profibus configurator 76 will designate a particular DP module index so that the order of the modules in the Profibus-DP device can be rearranged without having to reconfigure the whole device, which is the case with current Profibus-DP configuration tools.

TABLE 7

DP Module Browser Dialog

| Name | Type | Min | Max | Default | Content |
|---|---|---|---|---|---|
| Mobile list | list control | n/a | n/a | None | List of modules from the device type definition along with the input length and output length for each module |
| Bytes used table | set of 12 statics | n/a | n/a | None | Table which shows the user how many bytes have been used and how many are remaining as well as slots |

TABLE 8

Slot Properties Dialog

| Name | Type | Min | Max | Default | Content |
|---|---|---|---|---|---|
| Object type | static | n/a | n/a | Profibus Slot | Component type |
| Modified | static | n/a | n/a | Today's date | Date last modified |
| Modified by | Static | n/a | n/a | Current User | User who modified this object |
| Description | edit | n/a | n/a | None | Description of component |
| Enabled | check box | n/a | n/a | True | Is the slot enabled (will it be downloaded) |
| Input data length | static | n/a | n/a | None | Number of bytes in input messages |
| Output data length | static | n/a | n/a | None | Number of bytes in output messages |
| Parameter data length | static | n/a | n/a | None | Number of bytes in parameter data |
| Identifiers | static | n/a | n/a | None | List of identifiers |
| Module Number | edit | Module starting number | Module starting number + number of slots − 1 | Module starting number | The module number to use for this slot when downloading |

Of course, the user may create, enable, disable or delete slots as desired. When the user disables a slot, the module number is set to blank, the module name is retained and, because there will be a gap in the module number sequence, the user is automatically requested to assign the module number to another slot so that there are no gaps. Otherwise, a download using the modules for the assigned slots may not succeed. When enabling a slot, the module number may be set to the next available unused module number. When deleting a slot, the module may become available for use in another slot.

The user may also create one or more signals under a slot. In this case, the signal is created for the device in which the slot exits and, when the user names the signal, a DST is created for the signal. This DST may be used by the controller 12 to identify the signal coming from the devices in the remote I/O network.

Figure 15:
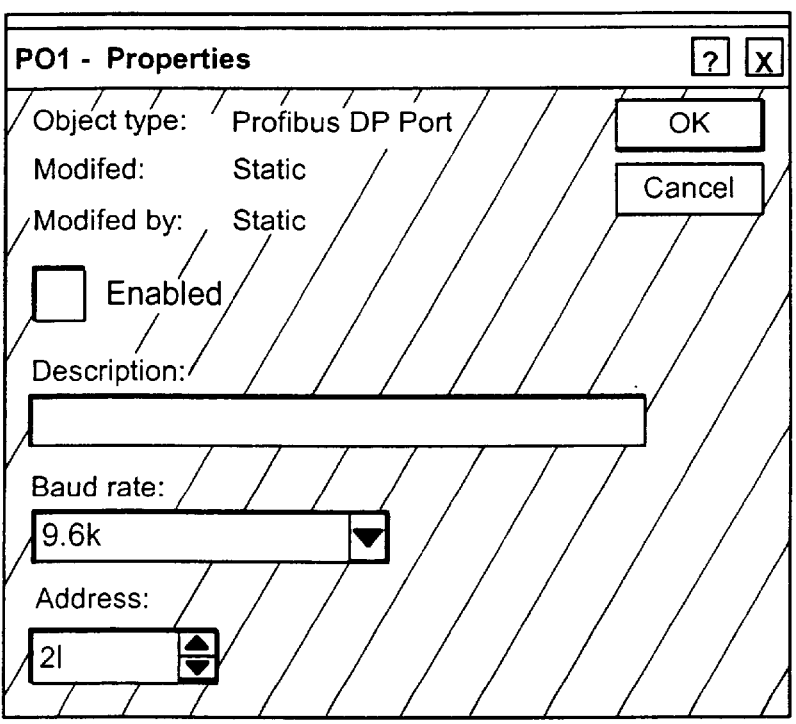
Figure 16:
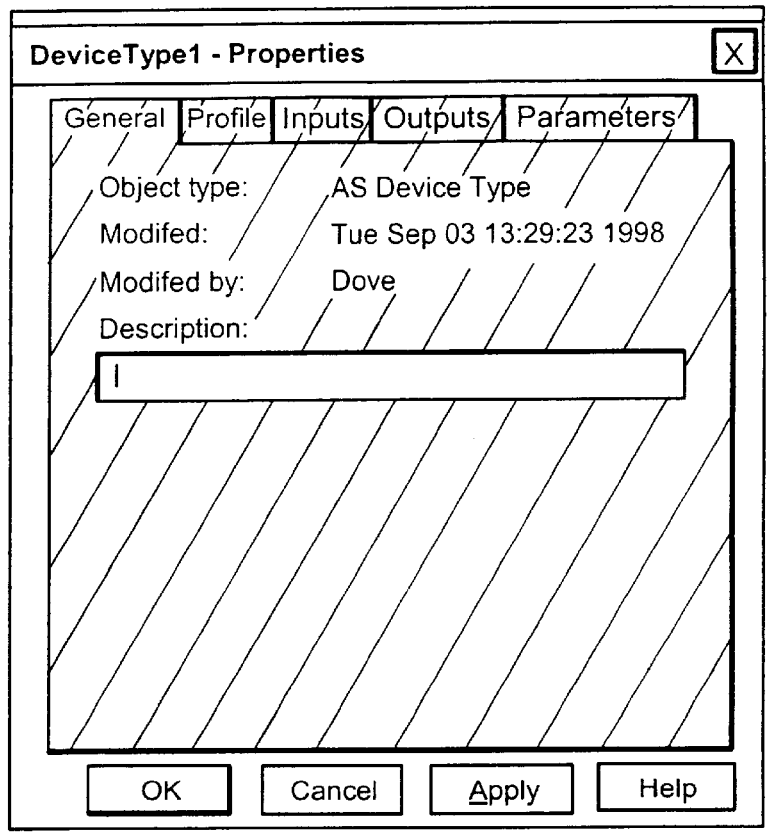
FIGS. 16–25 are example screen displays used by the configuration system of FIG. 2 to enable input, configuration and documentation of AS-Interface device network elements in the process control system of FIG. 1.
Figure 17:
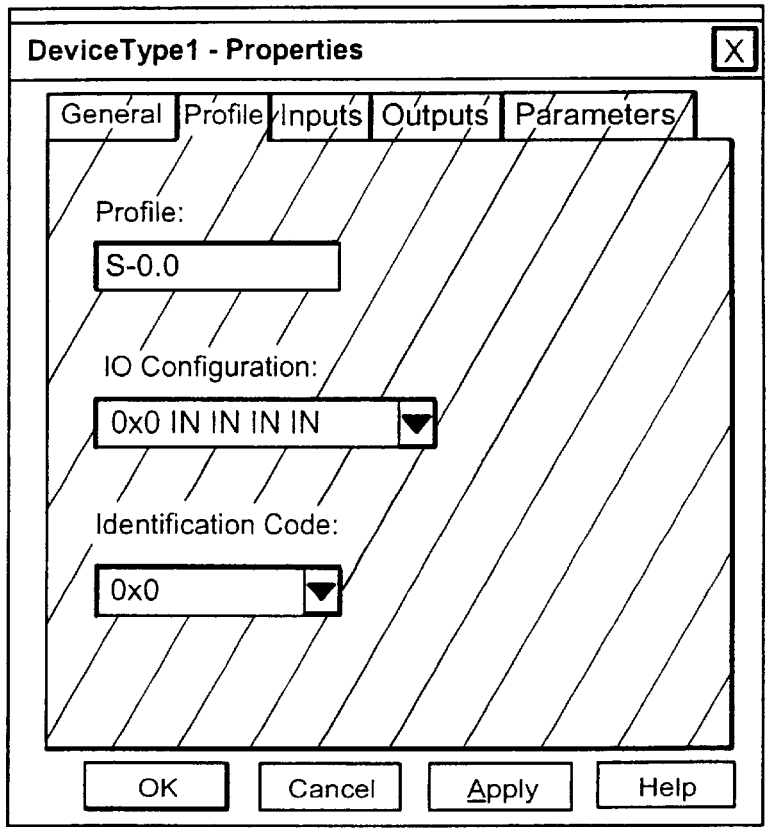
Figure 18:
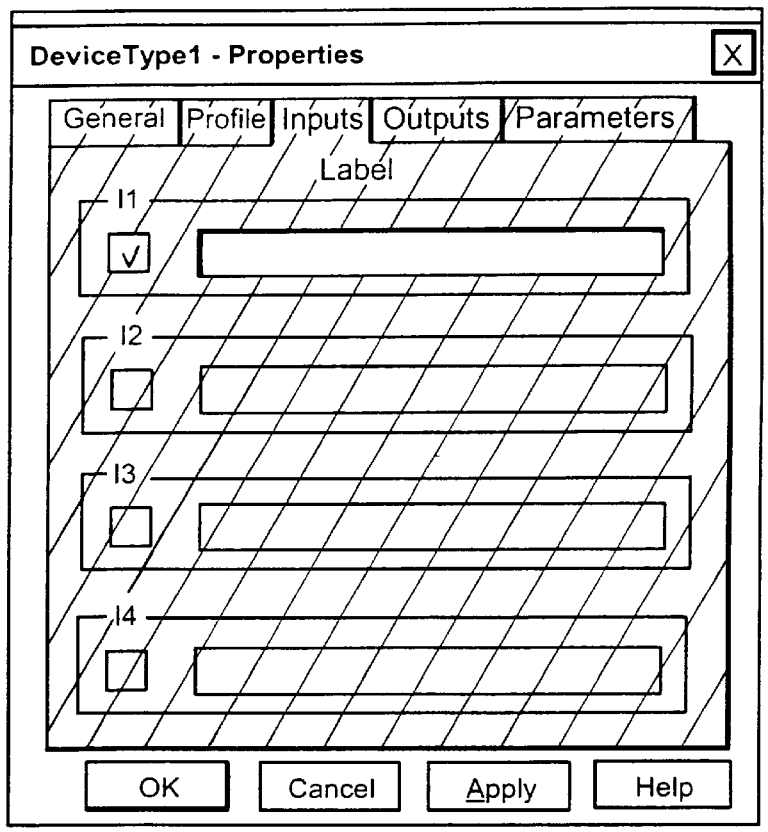
Figure 19:
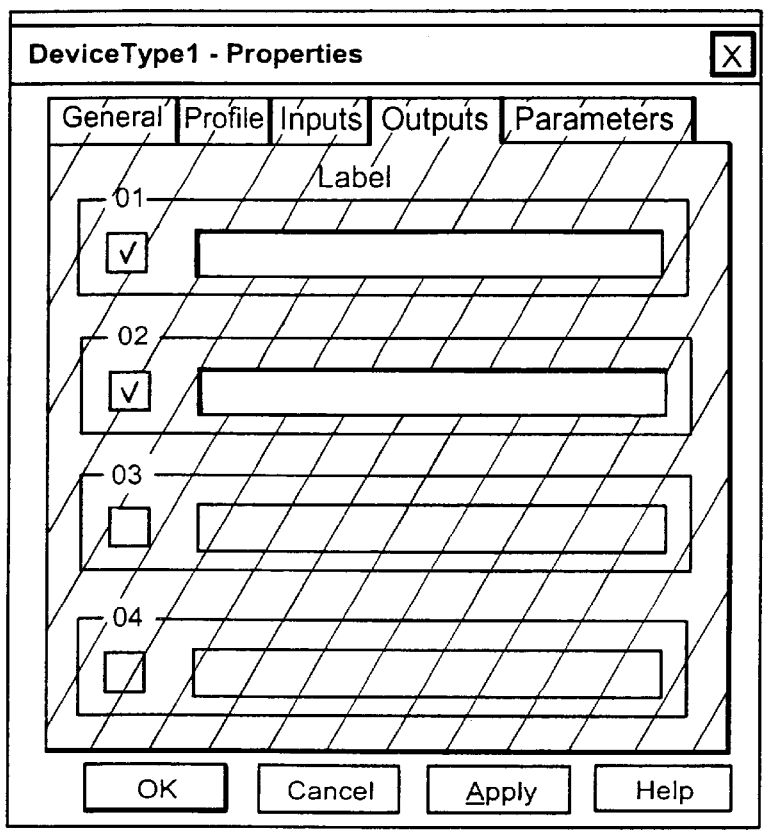
Figure 20:
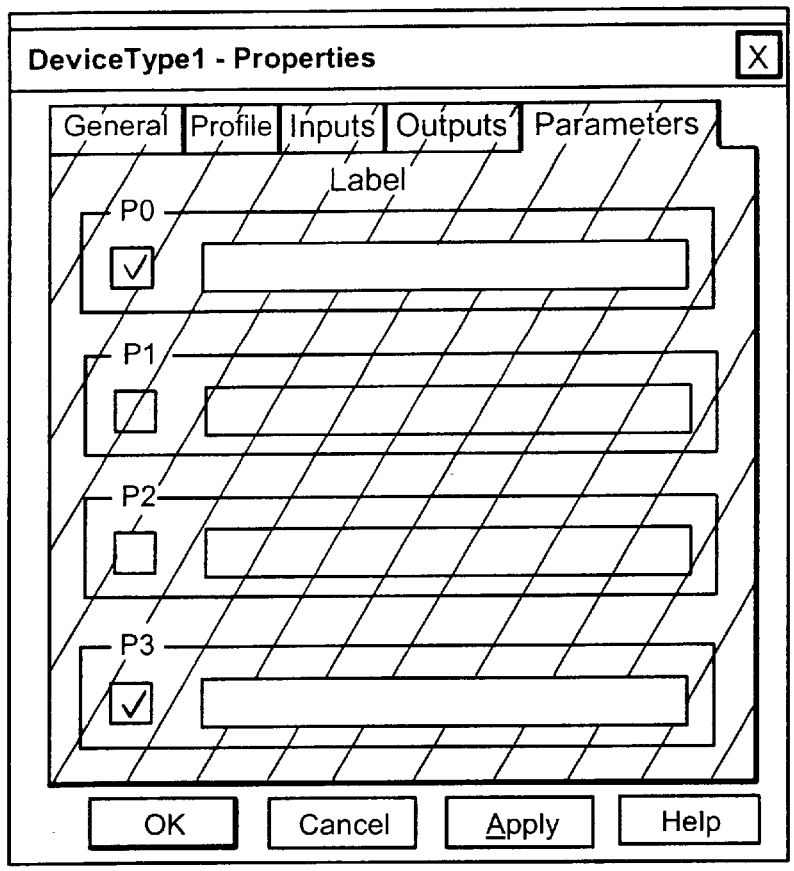

Of course, the user may copy devices, signals, slots, etc. and use these copied devices to create new devices, signals, slots, etc. The user may also create or edit a port definition. FIG. 15 illustrates a screen used to define a port (named P01) while Table 9 defines the properties of the port.

TABLE 9

Port Properties Dialog

| Name | Type | Min | Max | Default | Content |
|---|---|---|---|---|---|
| Object type | static | n/a | n/a | Profibus DP Slot | Component type |
| Modified | static | n/a | n/a | Today's date | Date last modified |
| Description | edit | n/a | n/a | Current User | User who modified this object |
| Baud rate | combo | n/a | n/a | None | Description of component |
| Enabled | check box | n/a | n/a | Unchecked | Port enabled |
| Address | combo | n/a | n/a | 0 | Port address 0–256 |

Also, the configuration system 70 may recognize, based on the action of a user, when information is needed, such as signal, device, module, etc. information and automatically prompt the user for this information using, for example, the dialog screens indicated herein.

Given the number of Profibus-DP devices that exist and the relative maturity of the protocol and implementations, it is desirable that a user be able to attach a conforming device to the network, and configure the network to exchange data with the device. In order to accomplish these actions, the following steps can be performed by the configuration system 70 of FIG. 2. First, the user should import the GSD file and the user input section 74 can have this import format available as an import submenu option. Importation of the GSD file can automatically create a device definition in the Library of FIG. 5A under the hierarchy of slave family (essentially standardized device types listed in the GSD spec), vendor, model, and revision.

Second, the user can, for a device in the Library, build a list modules, and signals for any module, and can also specify the default values for any device or module parameters. The user input routine 74 may enable a user to do this automatically. These parameter values override the default values supplied in the GSD file. Third, the user creates a device on (or attaches a device to) the proper Profibus I/O card port within the hierarchy of, for example, FIG. 5B, i.e., to reflect the actual connection of a Profibus device to the Profibus master I/O card in the control system 10. This may be accomplished using the documentation routine 78 in conjunction with the user input routine 74. The user can specify the address for the device and, if it is a modular device, specify in the correct order of the modules the device contains. Each module will be created with the signals and parameter values specified for the device type in the device library, but the user can override these values and add or delete signals. However, the user should assign all DSTs for the signals, these DSTs being used by the controller 12 to perform process control routines.

Fourth, the user downloads the port on the I/O card to the Profibus I/O card using the configurator 76 for the Profibus I/O card. If the configuration data is correct and the configuration matches, the device and the I/O card 55 start exchanging data. Fifth, the user configures the control application to use the signals by specifying the DST for each of the signals in the control application. The actual path for the DST may be by device, slot, and order of the signals within the slot, which means that the controller modules (i.e., the software modules within the controller 12 using signals from the Profibus card) do not have to be re-downloaded if new Profibus devices or Profibus modules are added. Reconfiguration of the Profibus card will only need to be performed if the user rearranges the signals within a slot, or changes the address of a device. Of course, the user can perform similar steps for an AS-Interface device network or any other device network, including the Fieldbus and HART device networks.

If a user changes the default parameter values for a device in the device type Library, the parameters of devices already created will preferably not be affected. If the parameters or signals for a module of a device in the device type Library are changed, current instances of that module are not affected, but any future module instances created, even for an existing device instance, will inherit the new parameter values and signals. To allow the inheritance of module signals and parameters from the Library to device instances, it is necessary to ensure that the Library definitions remain consistent with devices already created. Therefore, if a device instance is associated with a particular revision in the Library, that revision should not be re-imported or deleted.

The GSD file for Profibus devices contain text descriptions for specific bits and error codes provided in the diagnostic message read from the device. Hence, the configuration application should have access to the device definition to present this information to the user. This access can be accomplished using the configuration database 72, as all the information from the GSD file can be stored in an object for the device within the configuration database 72.

Profibus slave device address assignment over the Profibus link 53 is restricted to one device at a time, and this assignment is not supported by all slave devices. None-the-less, address assignment can be supported, if desired, by providing appropriate software in the Profibus I/O master card 55 when this card is configured. Also, if desired, auto-sensing software may be placed in the Profibus master I/O device 55 as part of the configuration of that device and this software may be used to auto-sense Profibus slave devices, although in many cases the specific module cannot be determined. If desired, the auto-sensing software can be operated to poll addresses on the Profibus bus 53 and sense the devices at those address. If a device is detected, the presence of the device is sent to the configuration routine 70 to be placed as an entry in the configuration database 72 and displayed to a user via the hierarchy created by the documentation routine 78. When a user views the detected device, the user may be prompted by the user input routine 74 to provide information pertaining to that device using, for example, the appropriate templates in the Profibus template database 80. In the Profibus protocol, parameters values cannot be uploaded and signal configuration cannot be determined. However, if desired, the Profibus master I/O device 55 may be programmed to upload the configuration of a device and provide a comparison with the manner in which that device is configured in the configuration database 72 to detect inconsistencies, and to display these inconsistencies to a user via a workstation 14.

In a similar manner, a user may enter information pertaining to each of the AS-Interface devices to create device definitions for AS-Interface devices, to configure the AS-Interface network 36, as well as to use signals from and send signals to the devices within that network. The user may, for example, define an AS-Interface device type using, for example, the Device Type property screens of FIG. 16 (General information), FIG. 17 (Profile page), FIG. 18 (Inputs page), FIG. 19 (Outputs page) and FIG. 20 (parameters page). Tables 10–14 define the properties in these pages.

TABLE 10

General Property Page of AS Interface Device Type Dialog

| Name | Type | Min | Max | Default | Content |
|---|---|---|---|---|---|
| Object type | edit | n/a | n/a | As-Interface Device | Component type |
| Modified | edit | n/a | n/a | Today's date | Date last modified |
| Modified by | edit | n/a | n/a | Current User | User who modified this object |
| Description | edit | n/a | n/a | None | Description of component |

TABLE 11

Profile Property Page of AS Interface Device Type Dialog

| Name | Type | Min | Max | Default | Content |
|---|---|---|---|---|---|
| Profile | edit | n/a | n/a | S-0-0 | Combination of S-[O Configuration] [identification code] |
| I/O Configuration Code | combo box | n/a | n/a | 0x0 IN IN IN IN | I/O Configuration Type 0x0 to 0xF items with corresponding descriptors - See Note below. |
| Identification Code | combo box | n/a | n/a | 0x0 | Identification Code 0x0 to 0xF |

NOTE: The I/O configuration combo box may contains the following list.

"0x0 IN IN IN IN",
"0x1 IN IN IN OUT",
"0x2 IN IN IN I/O",
"0x3 IN IN OUT OUT",
"0x4 IN IN I/O I/O",
"0x5 IN OUT OUT OUT",
"0x6 IN I/O I/O I/O",
"0x7 I/O I/O I/O I/O",
"0x8 OUT OUT OUT OUT",
"0x9 OUT OUT OUT IN",
"0xA OUT OUT OUT I/O",
"0xB OUT OUT IN IN",
"0xC OUT OUT I/O I/O",
"0xD OUT IN IN IN",
"0xE OUT I/O I/O I/O",
"0xF TRI TRI TRI TRI"

These settings, which are provided by and correspond to the possible settings available within the AS-Interface protocol can be used to enable/disable check boxes on the inputs and outputs property page according to which I/O configuration choice is made. For example, if 0x0 is selected, all the output check boxes would be disabled.

TABLE 12

Inputs Property Page of AS Interface Device Type Dialog

| Name | Type | Min | Max | Default | Content |
|---|---|---|---|---|---|
| I1 | check box | n/a | n/a | Unchecked | D0 Input enabled |
| I1 | edit box | n/a | n/a | Disabled | If Check box checked then enable and user can enter the label for this Input discrete I/O |
| I2 | check box | n/a | n/a | Unchecked | D1 Input enabled |
| I2 | edit box | n/a | n/a | Disabled | If Check box checked then enable and user can enter the label for this Input discrete I/O |
| I3 | check box | n/a | n/a | Unchecked | D2 Input enabled |
| I3 | edit box | n/a | n/a | Disabled | If Check box checked then enable and user can enter the label for this Input discrete I/O |
| I4 | check box | n/a | n/a | Unchecked | D3 Input enabled |
| I4 | edit box | n/a | n/a | Disabled | If Check box checked then enable and user can enter the label for this Input discrete I/O |

TABLE 13

Outputs Property Page of AS Interface Device Type Dialog

| Name | Type | Min | Max | Default | Content |
|---|---|---|---|---|---|
| O1 | check box | n/a | n/a | Unchecked | D0 Output enabled |
| O1 | edit box | n/a | n/a | Disabled | If Check box checked then enable and user can enter the label for this Output discrete I/O |
| O2 | check box | n/a | n/a | Unchecked | D1 Output enabled |
| O2 | edit Box | n/a | n/a | Disabled | If Check box checked then enable and user can enter the label for this Output discrete I/O |
| O3 | check box | n/a | n/a | Unchecked | D2 Output enabled |
| O3 | edit box | n/a | n/a | Disabled | If Check box checked then enable and user can enter the label for this Output discrete I/O |
| O4 | check box | n/a | n/a | Unchecked | D3 Output enabled |
| O4 | edit box | n/a | n/a | Disabled | If Check box checked then enable and user can enter the label for this Output discrete I/O |

TABLE 14

Parameters Property Page of AS Interface Device Type Dialog

| Name | Type | Min | Max | Default | Content |
|---|---|---|---|---|---|
| P0 | check box | n/a | n/a | Unchecked | P0 Parameter enabled |
| P0 | edit box | n/a | n/a | Disabled | If Check box checked then enable and user can enter the label for this Parameter |
| P1 | check box | n/a | n/a | Unchecked | P1 Parameter enabled |
| P1 | edit box | n/a | n/a | Disabled | If Check box checked then enable and user can enter the label for this Parameter |
| P2 | check box | n/a | n/a | Unchecked | P2 Parameter enabled |
| P2 | edit box | n/a | n/a | Disabled | If Check box checked then enable and user can enter the label for this Parameter |

TABLE 14-continued

Parameters Property Page of AS Interface Device Type Dialog

| Name | Type | Min | Max | Default | Content |
|---|---|---|---|---|---|
| P3 | check box | n/a | n/a | Unchecked | P3 Parameter enabled |
| P3 | edit box | n/a | n/a | Disabled | If Check box checked then enable and user can enter the label for this Parameter |

Figure 21:
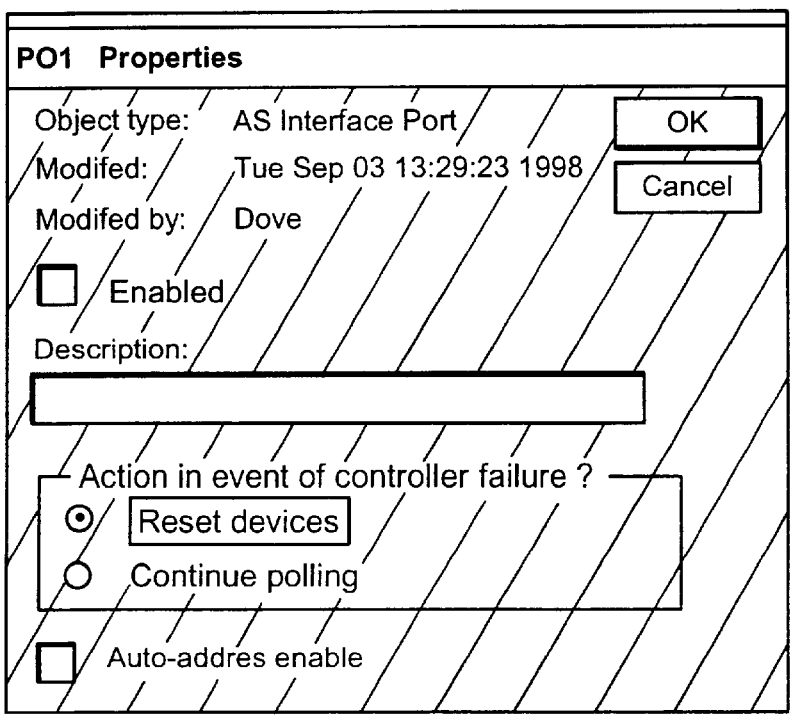
Figure 22:
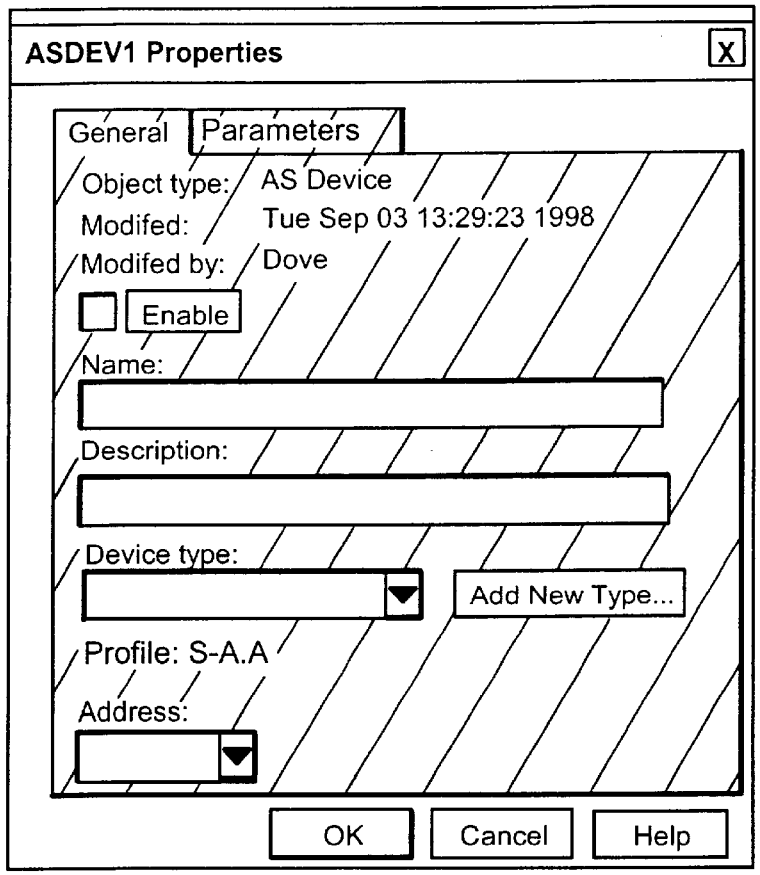
Figure 23:
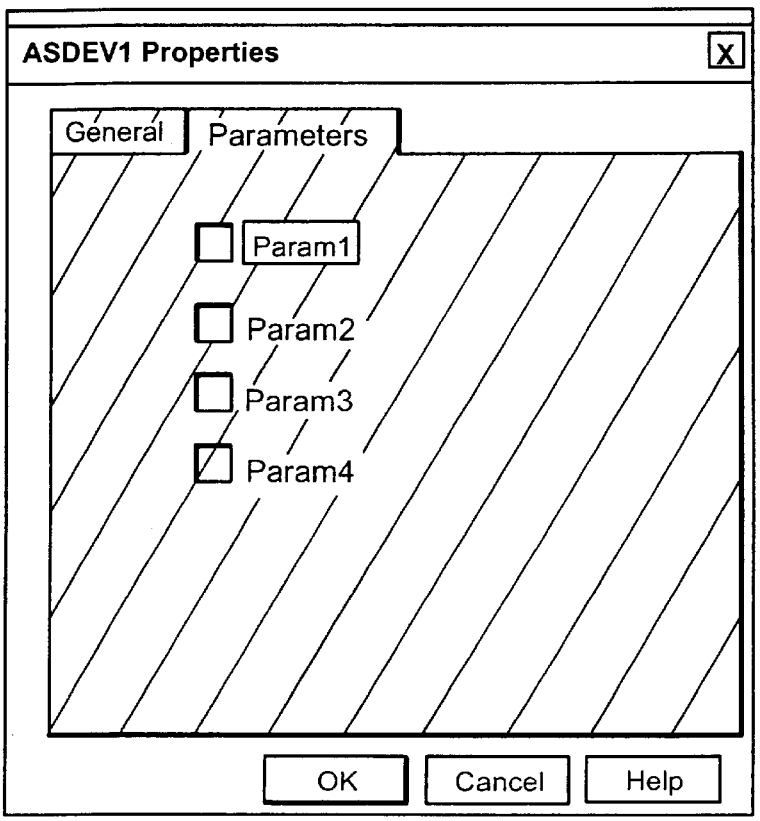

The user may also create and edit new AS-Interface cards. The user may select a new card from the context menu within the hierarchy created by the documentation routine 78 illustrated in, for example, FIG. 5B, and select the card type as AS-Interface which causes the system to create a new AS-Interface card. Likewise, the user may create, edit, etc. an AS-Interface port within the hierarchy by adding AS-Interface devices, and associated inputs and outputs and parameters. The properties screen for such a port are illustrated in FIG. 21 with the properties being defined in Table 15 below.

TABLE 15

AS Interface Port Properties Dialog

| Name | Type | Min | Max | Default | Content |
|---|---|---|---|---|---|
| Object type | edit | n/a | n/a | AS Interface Port | Component type |
| Modified | edit | n/a | n/a | Today's date | Date last modified |
| Modified by | edit | n/a | n/a | Current User | User who modified this object |
| Description | edit | n/a | n/a | None | Description of component |
| Enabled | check box | n/a | n/a | Unchecked | Port enabled flag |
| Reset devices | radio box | n/a | n/a | Checked | Reset devices when controller fails |
| Continue polling | radio box | n/a | n/a | Unchecked | Continue polling when controller fails. |
| Auto-address enable | check box | n/a | n/a | Checked | Port will automatically assigned addresses to new devices |

Similarly, the user may create or edit an AS-Interface device. The user may select an AS-Interface port, and then select a new device from the context menu. The AS-Interface device properties dialog window appears automatically (i.e., is created by the user input routine 74) having, for example, a general page and a properties page, such as those illustrated in FIGS. 22 and 23, the properties of which are defined more fully in Tables 16 and 17 below.

TABLE 16

AS Device Properties General Page

| Name | Type | Min | Max | Default | Content |
|---|---|---|---|---|---|
| Object type | edit | n/a | n/a | AS Interface Port | Component type |
| Modified | edit | n/a | n/a | Today's date | Date last modified |
| Modified by | edit | n/a | n/a | Current User | User who modified this |
| Name | edit | n/a | n/a | Default device name ASDEV1 | Device Name - enabled if user selected new child, disabled if user did modify |
| Description | edit | n/a | n/a | None | Description of component |
| Enabled | check box | n/a | n/a | Unchecked | Device enabled flag |
| Device Type | combo box | n/a | n/a | First item in drop down list | Device type being created - enabled if user selected new child, disabled if user modify |
| Add New Type | push button | n/a | n/a | n/a | Allows the addition of a new device type. |
| Profile | static | n/a | n/a | Empty | Profile of device type |
| Address | edit box | 1 | 31 | 1 | Address for device |

TABLE 17

AS Device Advanced Property Page

| Name | Type | Min | Max | Default | Content |
|---|---|---|---|---|---|
| Param1 | check box | n/a | n/a | Checked | Bit value for param1. Will take name from device type. |
| Param2 | check box | n/a | n/a | Checked | Bit value for param2. Will take name from device type. |
| Param3 | check box | n/a | n/a | Checked | Bit value for param3. Will take name from device type. |
| Param4 | check box | n/a | n/a | Checked | Bit value for param4. Will take name from device type. |

The user may enter a tag or name for the device, indicate whether the device is enabled, indicate a device type for the device and an address for the device. The discrete device I/O components associated with the device type are automatically created for this device based on template information pertaining to AS-Interface devices or manufacturing files for AS-Interface devices and the device will be given a DST by the user (who can be automatically prompted for this information upon creation of a device or downloading the device to a port within the hierarchy of FIG. 5B.) The DST can then be used by the controller 12 to identify the device and signals coming from the device.

AS-Interface devices do not have to support address assignment over the bus, but generally, this is the case. If so, the address must be stored in non-volatile memory in the controller 12, or AS-Interface master I/O card 60. It is preferable that the address be capable of being reassigned at least 10 times. Because there is only one default address (zero) in the AS-Interface protocol, the user may opt to assign the address for a device offline and then attach the device to the network 36, or attach the device with address zero and assign the address through the AS-Interface master I/O device 60 using the auto address assignment feature of this device provided by the AS-Interface protocol.

Auto-sensing of AS-Interface devices may be done in a manner similar to auto-sensing of AS-Interface cards. Upon a menu option from the hierarchy of FIG. 5B for a particular port, the list of detected slaves devices with addresses, I/O configuration, and identification code is read from the AS-Interface master I/O device 60. The user can then include these devices in the system configuration by specifying their types and parameter bit values which is automatically requested using the templates of, for example, the FIGS. 16–23 stored in the AS-Interface template database 82. The configuration routine 70 may then download a port to activate the new devices attached to that port. The auto-sense dialog may also enable a user to clear the address of a detected slave, which eliminates the necessity of using a handheld terminal to perform this function.

Figure 24:
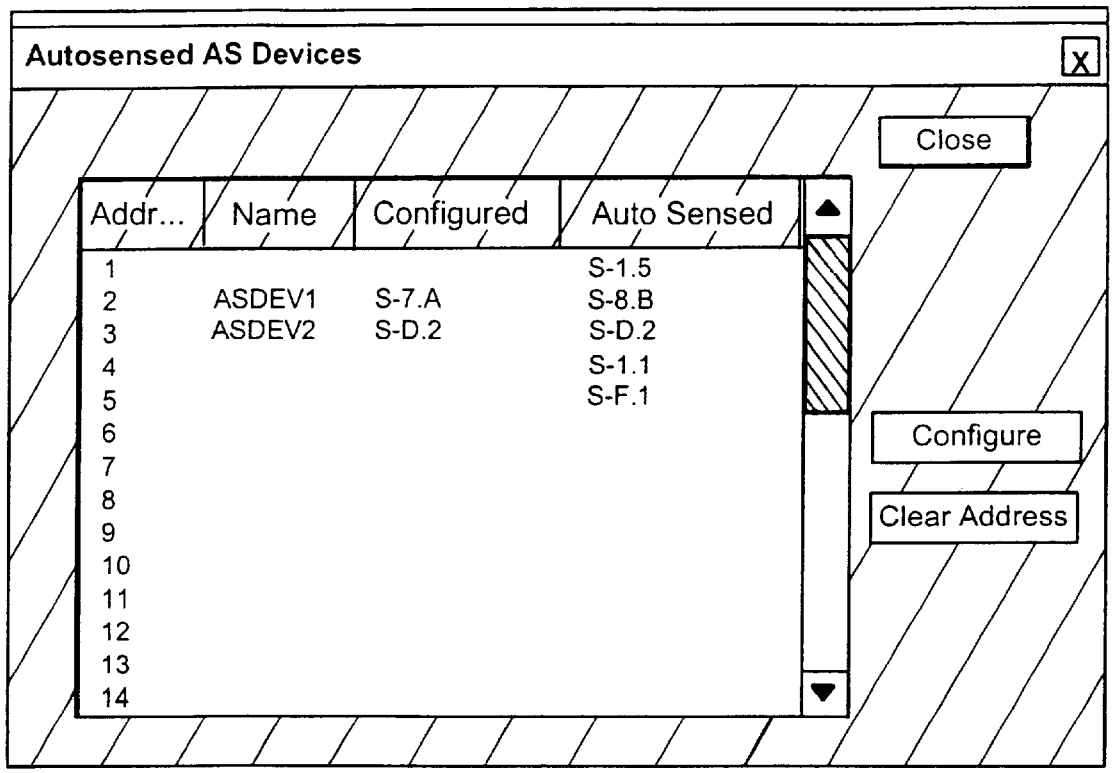
Figure 25:
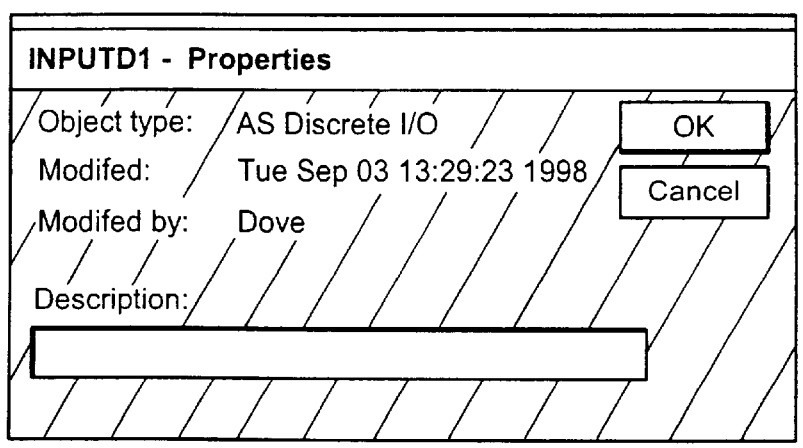

The user may also, if desired, auto-sense devices on the AS-Interface card. To do so, the user may select the AS-Interface port (such as P01) which causes a context menu to appear. The user may select the auto-sense feature within the context menu. The system 70 will then auto-sense devices by implementing the auto-sense capabilities of the AS-Interface master I/O card 60 and will provide the user a list of the devices sensed and cross-referenced to the devices within the database on an address by address basis. Such a screen display is illustrated in FIG. 24. The devices not in the database will have blank entries in the configured column, such as the devices at address numbers 1, 4 and 5 of FIG. 24. The user may select an unconfigured device and click the configure button to configure that device. The user input routine 74 then provides the user an AS-Interface device properties dialog that the user can use to configure the device. The AS device properties dialog box will include a default name in the name field, with the profile and address entered on the advanced pages. Only device types compatible with the profile will be populated into the device type combo box. If the auto-sensed device is at address 0, then the address field will be selectable. Otherwise, the address field is preferably not changeable. On an advanced page (not shown), the configuration system 70 will populate the parameters associated with the parameters defined for that device type. Some of these parameters may be disabled if not all the parameters are valid. After the desired changes are made, the user selects the OK button which causes the device to be created and configured within the configuration database 72. Still further, the configurator 76 can perform address assignment and cleaning such as detecting multiple addresses or the same address used by different devices in the AS-Interface network 36 and may notify the user of detected redundant addresses.

The user may also create or specify discrete I/O properties for an AS-Interface device. The user may select a discrete I/O component in the contents pane of a device on the documentation schematic, such as that of FIGS. 5A and 5B. A context menu appears and the user may select a properties choice. The discreet I/O component property dialog appears, such as that of FIG. 25 and the user may provide a description of the discrete I/O component.

Of course, if desired, other information for these or other types of remote I/O networks could be provided as well depending on the capabilities and the design of the device network. Still further, the user can enter and edit information associated with each device, module, slot, property, parameter, etc. of each device in any desired manner. Preferably, however, the user is prompted for the needed information to enable ease of use of the system. It will, of course, be understood that the templates of FIG. 2 may include the screen displays, or the information required to make the screen displays and to fill in the data therein for each of the devices, device types, signals, modules, parameters, slots, etc. for the device networks.

Because the configuration routine 70 collects and stores all of the information necessary to configure each of the devices in each of the different device networks associated with the system 10 in a single database 72 and uses this same database 72 to configure the remote I/O device networks and to document this configuration, the user only needs to enter data pertaining to the remote I/O networks once, which can be done at the same time that the user inputs information pertaining to other device networks such as other remote I/O device networks as well as other conventional or local device I/O networks. All of this device information is stored in a common integrated configuration database 72 which can be used to document the manner in which the different devices are connected through the controllers in the process control system 10 as well as to configure the master devices associated with local, specialized and remote I/O device networks.

Placing the configurator 76 in the host workstation 12 (or alternatively in the controller 12), and enabling this configurator 76 to use the data stored in the configuration database 72 allows the user to input information pertaining to each of the devices in each of the remote I/O networks (such as the networks 34 and 36) only once but have this information integrated with the configuration information pertaining to other devices within the system 10 such as Fieldbus and HART devices, enables automatic documentation of that information in the same way information pertaining to the other devices within the system 10 is documented in a hierarchy such as an explorer-type tree like that of FIGS. 5A and 5B, and have the remote I/O network devices automatically configured.

While the configuration tool 70 has been described as being used in conjunction with Fieldbus and HART devices, it can be implemented to configure and document any other external process control device communication protocol as well. Although the configuration tool 70 described herein is preferably implemented in software, it may be implemented in hardware, firmware, etc., and may be implemented by any other processor associated with the process control system 10. Thus, the routine 70 described herein may be implemented in a standard multi-purpose CPU or on specifically designed hardware or firmware as desired. When implemented in software, the software routine may be stored in any computer readable memory such as on a magnetic disk, a laser disk, or other storage medium, in a RAM or ROM of a computer or processor, etc. Likewise, this software may be delivered to a user or a process control system via any known or desired delivery method including, for example, on a computer readable disk or other transportable computer storage mechanism or over a communication channel such as a telephone line, the internet, etc. (which are viewed as being the same as or interchangeable with providing such software via a transportable storage medium).

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A configuration system for use in a process control network having a controller coupled to a first device network that communicates using a first input/output protocol and coupled to a second device network that communicates using an AS-Interface input/output communication protocol, the configuration system comprising:

a configuration database;

a data access routine that automatically requests first device network configuration information pertaining to the first device network and AS-Interface device network configuration information pertaining to the AS-Interface device network; and a configurator that configures the AS-Interface device network based on the AS-Interface device network configuration information;

wherein said first device network configuration information and said AS-Interface device network configuration information is stored in the configuration database.

2. The configuration system of claim 1, wherein the configurator configures the first device network based on the first device network configuration information.

3. The configuration system of claim 1, wherein the first device network is a Fieldbus device network.

4. The configuration system of claim 1, wherein the first device network is a HART device network.

5. The configuration system of claim 1, wherein the data access routine includes a file access routine that accesses an external file associated with a first device within the AS-Interface device network to obtain some of the AS-Interface device network configuration information.

6. The configuration system of claim 1, wherein the configuration database is an object-oriented database.

7. The configuration system of claim 1, wherein the data access routine includes a template for the second device network, said template storing indications of the AS-Interface device network configuration information needed to be obtained for the AS-Interface device network to configure the AS-Interface device network.

8. The configuration system of claim 1, wherein the data access routine accesses information pertaining to a type of a device associated with the AS-Interface device network.

9. The configuration system of claim 1, wherein the data access routine accesses information pertaining to a device input or a device output of a device associated with the AS-Interface device network.

10. The configuration system of claim 1, wherein the data access routine accesses information pertaining to signal tag of a signal associated with the AS-Interface device network.

11. The configuration system of claim 1, wherein the data access routine accesses information pertaining to a parameter of a device associated with the AS-Interface device network.

12. The configuration system of claim 1, wherein the data access routine accesses a hierarchy of information pertaining to a device within the AS-Interface device network.

13. The configuration system of claim 12, wherein the hierarchy includes information pertaining to a device, an input or an output of the device, and a label associated with the device.

14. The configuration system of claim 1, wherein the AS-Interface device network includes an AS-Interface master I/O device, wherein the configurator is an AS-Interface configurator and wherein the configurator uses the AS-Interface device network configuration information to configure the AS-Interface master I/O device.

15. The configuration system of claim 14, wherein the configurator maps a signal defined by a signal tag within the AS-Interface device network configuration information to a memory location within the AS-Interface master I/O device.

16. The configuration system of claim 14, wherein the configurator determines configuration data to be used by the AS-Interface master I/O device to configure a device within the AS-Interface device network.

17. The configuration system of claim 14, wherein the configurator includes auto-sensing software that enables auto-sensing of devices on the AS-Interface device network and uses the auto-sensing software to auto-sense the presence of one or more devices connected on the AS-Interface device network.

18. The configuration system of claim 1, further including a documentation routine that displays a configuration schematic of the process control network based on the first device configuration information and the AS-Interface device network configuration information stored in the configuration database.

19. The configuration system of claim 18, wherein the displayed configuration schematic is a windows explorer-type schematic.

20. The configuration system of claim 18, wherein the configuration schematic includes a system configuration section having a first portion illustrating the configuration of the first device network and a second portion illustrating the AS-Interface device network.

21. The configuration system of claim 1, wherein the configurator enables address assignment of devices on the AS-Interface device network.

22. The configuration system of claim 1, wherein the configurator enables address clearing with respect to devices on the AS-Interface device network.

23. The configuration system of claim 1, wherein the data access routine enables a user to create a device definition for a first device connected to the AS-Interface device network.

24. A method of configuring a process control system including a controller, a first device network that uses a first communication protocol and an AS-Interface device network which has an AS-Interface device connected to an AS-Interface I/O card and which uses an AS-Interface communication protocol, the method including the steps of:

creating a device definition associated with the AS-Interface device for storage in a configuration database, said device definition including information pertaining to a signal associated with the AS-Interface device;

using a configuration documentation system to associate an indication of the AS-Interface device with a port of the AS-Interface I/O card to reflect the actual connection of the AS-Interface device to the process control system;

assigning a signal tag for the signal associated with the AS-Interface device as connected within the process control system;

downloading a configuration of the port of the AS-Interface I/O card to the AS-Interface I/O card; and configuring a control application to be run in the controller to use the signal by specifying the signal tag to be used by the control application.

25. The method of claim 24, wherein the step of creating a device definition includes the step of using a device description file related to the AS-Interface device.

26. The method of claim 24, wherein the step of creating a device definition includes the step of building a list of one or inputs associated with the AS-Interface device.

27. The method of claim 24, wherein the step of creating a device definition includes the step of building a list of one or outputs associated with the AS-Interface device.

28. The method of claim 24, wherein the step of creating a device definition includes the step of specifying a manufacturer, a model, and a revision of the AS-Interface device.

29. The method of claim 24, wherein the step of creating a device definition includes the step of specifying a value for a parameter associated with the AS-Interface device.

30. The method of claim 24, wherein the step of using the configuration documentation system includes the step of specifying an address for the AS-Interface device within the AS-Interface device network.

31. The method of claim 24, wherein the step of using the configuration documentation system includes the step of specifying a tag for the AS-Interface device.

32. The method of claim 24, wherein the step of downloading the configuration of the port includes the step of configuring the AS-Interface I/O card to communicate with the AS-Interface device via the port.

33. The method of claim 24, wherein the step of downloading the configuration of the port includes the step of mapping the signal defined by the signal tag to a memory location within the AS-Interface I/O card.

34. The method of claim 24, wherein the step of downloading the configuration of the port includes the step of determining a configuration data string to be used by the AS-Interface I/O device to configure the AS-Interface device.

35. The method of claim 24, further including the step of storing the device definition in the configuration database.

36. The method of claim 24, further including the step of illustrating the connection of the AS-Interface device to the process control system in conjunction with illustrating the first device network.

37. The method of claim 24, further including the step of storing configuration data for the AS-Interface device network and configuration data for the first device network in an object oriented database.

38. A configuration system for use in a process control network having a controller, a first device network that communicates using a first input/output protocol and an AS-Interface device network that communicates using an AS-Interface input/output communication protocol, the configuration system comprising:

a configuration database that stores configuration information pertaining to the first device network and configuration information pertaining to the AS-Interface device network;

a data acquisition routine that builds a device definition for an AS-Interface device for storage in the configuration database, said device definition including information pertaining to a signal associated with the AS-Interface device;

a configuration documentation system that enables a user to indicate a desired configuration by associating an indication of the AS-Interface device with a port of an AS-Interface I/O card to reflect the actual connection of the AS-Interface device to the process control network;

a configurator that configures the AS-Interface device network based on the device definition of the AS-Interface device and on the indicated desired configuration.

39. The configuration system of claim 38, wherein the data acquisition routine assigns a signal tag for the signal associated with the AS-Interface device.

40. The configuration system of claim 38, wherein the configurator downloads a configuration of the AS-Interface I/O card to the AS-Interface I/O card based on the device definition for the AS-Interface device.

41. The configuration system of claim 38, wherein the data acquisition routine acquires device definition data pertaining to the AS-Interface device from a device description file related to the AS-Interface device.

42. The configuration system of claim 38, wherein the data acquisition routine creates a device definition by building a list of one or inputs or outputs associated with the AS-Interface device.

43. The configuration system of claim 38, wherein the data acquisition routine enables a user to specify an address for the AS-Interface device within the AS-Interface device network.

44. The configuration system of claim 38, wherein the configurator downloads the configuration of the port by mapping the signal to a memory location within the AS-Interface I/O card.

45. The configuration system of claim 38, wherein the configurator determines a configuration data string to be used by the AS-Interface I/O device to configure the AS-Interface device.

46. The configuration system of claim 38, wherein the configurator includes an auto-sensing routine that auto-senses devices attached to the AS-Interface device network.

* * * * *

UNITED STATES PATENT AND TRADEMARK OFFICE
CERTIFICATE OF CORRECTION

PATENT NO. : 6,446,202 B1
DATED : September 3, 2002
INVENTOR(S) : Kenneth D. Krivoshein et al.

It is certified that error appears in the above-identified patent and that said Letters Patent is hereby corrected as shown below:

Column 5,
Line 21, delete "the".

Column 6,
Line 1, delete "master I/O master" and insert -- master I/O --.
Line 24, delete "schematic have" and insert -- schematic and have --.

Column 17,
Line 3, delete "the correct the" and insert -- the correct --.

Column 23,
Line 47, delete "Microsoft" and insert -- Microsoft® --.

Column 28,
Line 50, delete "those address" and insert -- those addresses --.

Column 29,
Line 31, delete "[O Configuration]" and insert -- [O Configuration]- --.

Column 36,
Line 15, delete "windows explorer-" and insert -- Windows® Explorer- --.

Signed and Sealed this

Thirty-first Day of August, 2004

JON W. DUDAS
*Director of the United States Patent and Trademark Office*